United States Patent
Yerdon et al.

(10) Patent No.: US 10,377,321 B2
(45) Date of Patent: Aug. 13, 2019

(54) RELEASABLE ZERO BACKLASH PASSIVE LOCKING MECHANISM FOR A VEHICLE MOUNTED ROTARY CAMERA MAST

(71) Applicant: Google LLC, Mountain View, CA (US)

(72) Inventors: Mark Yerdon, Sunnyvale, CA (US); Jordan Wakser, North Canton, OH (US)

(73) Assignee: Google LLC, Mountain View, CA (US)

(*) Notice: Subject to any disclaimer, the term of this patent is extended or adjusted under 35 U.S.C. 154(b) by 97 days.

(21) Appl. No.: 15/796,087

(22) Filed: Oct. 27, 2017

(65) Prior Publication Data
US 2019/0126846 A1 May 2, 2019

(51) Int. Cl.
*B60R 11/04* (2006.01)
*B60R 11/00* (2006.01)
*F16M 13/02* (2006.01)
*F16M 11/38* (2006.01)

(52) U.S. Cl.
CPC ......... *B60R 11/04* (2013.01); *B60R 2011/004* (2013.01); *B60R 2011/005* (2013.01); *B60R 2011/0084* (2013.01); *F16M 11/38* (2013.01); *F16M 13/02* (2013.01); *F16M 2200/024* (2013.01)

(58) Field of Classification Search
CPC ..... F16B 7/1454; G03B 17/561; B60R 11/04; B60R 2011/0082
See application file for complete search history.

(56) References Cited

U.S. PATENT DOCUMENTS

| | | | |
|---|---|---|---|
| 3,589,757 A | 6/1971 | Mooney | |
| 4,185,936 A | 1/1980 | Takahashi | |
| 4,413,451 A * | 11/1983 | Featherstone | B60Q 1/2657 277/553 |
| 4,600,980 A * | 7/1986 | Dahlgren | E04H 12/182 362/385 |
| 6,484,456 B1 * | 11/2002 | Featherstone | H01Q 1/08 362/249.09 |

(Continued)

OTHER PUBLICATIONS

Bell, J. F., III et al. (2017), The Mars Science Laboratory Curiosity rover Mastcam instruments: Preflight and in-flight calibration, validation, and data archiving, Earth and Space Science, 4, 396-452, doi:10.1002/2016EA000219.

(Continued)

*Primary Examiner* — Bradley Duckworth
(74) *Attorney, Agent, or Firm* — Lerner, David, Littenberg, Krumholz & Mentlik, LLP

(57) ABSTRACT

A rotary locking joint that has zero backlash is provided to secure a camera mast mounted on a vehicle in a deployed position. The joint is passive to lock while being easily releasable. The joint prevents rotation of the mast in one direction, with a hard stop element that prevents further rotation of the mast in the opposite direction. The locking joint includes a pawl member configured to rotate about a pawl rotation axis. The pawl member is maintained in place in the locked position via a torsion spring to ensure contact with a base portion of the mast. To release the joint, the pawl member is rotated in the opposite direction to remove a geometry interference condition. A sensor is arranged to detect whether the pawl member is in an unlocked position relative to the mast.

9 Claims, 26 Drawing Sheets

(56) References Cited

U.S. PATENT DOCUMENTS

| | | | |
|---|---|---|---|
| 6,880,987 B2 | 4/2005 | Diana et al. | |
| 8,137,008 B1 * | 3/2012 | Mallano | B60R 11/04 |
| | | | 396/427 |
| 8,550,632 B2 * | 10/2013 | Chapman | F16M 11/18 |
| | | | 180/246 |
| 9,253,376 B2 | 2/2016 | Boyle et al. | |
| 9,405,173 B1 | 8/2016 | Okunami | |
| 9,919,748 B2 * | 3/2018 | Williams | B62D 35/00 |
| 2009/0152431 A1 | 6/2009 | Melic | |
| 2018/0001836 A1 * | 1/2018 | Pan | B60R 1/00 |
| 2018/0059516 A1 * | 3/2018 | Taylor | G03B 17/00 |

OTHER PUBLICATIONS

Liu et al., "The Kapvik Robotic Mast an Innovative Onboard Robotic Arm for Planetary Exploration Rovers," Mar. 13, 2015, IEEE Robotics & Automation Magazine, Digital Object Identifier 10.1109/MRA.2014.2356935, p. 34-44.

Warden et al, "Pancam Mast Assembly on Mars Rover," Proceedings of the 37th Aerospace Mechanisms Symposium, Johnson Space Center, May 19-21, 2004, p. 263-276.

Sokol et al, "High Gain Antenna Gimbal for the 2003-2004 Mars Exploration Rover Program," Proceedings of the 37th Aerospace Mechanisms Symposium, Johnson Space Center, May 19-21, 2004, p. 237-250.

Hammoudi et al., "Design, Implementation and Simulation of an Experimental Multi-Camera Imaging System for Terrestrial and Multi-Purpose Mobile Mapping Platforms: A Case Study," Department of Computer Science, National University of Ireland Maynooth, Co. Kildare, Ireland, retrieved from the Internet Sep. 6, 2017.

Boesiger, E. A., "37th Aerospace Mechanisms Symposium," Proceedings of a symposium held at Moody Gardens Hotel, Galveston, TX, Hosted by the Johnson Space Center and Lockheed Martin Space Systems Company, Organized by the Mechanisms Education Association, May 19-21, 2004.

Anguelov et al., Google Street View: Capturing the World at Street Level, Published by the IEEE Computer Society, 2010.

International Search Report and Written Opinion for PCT Application No. PCT/US2018/044507, dated Nov. 23, 2018. 14 pages.

* cited by examiner

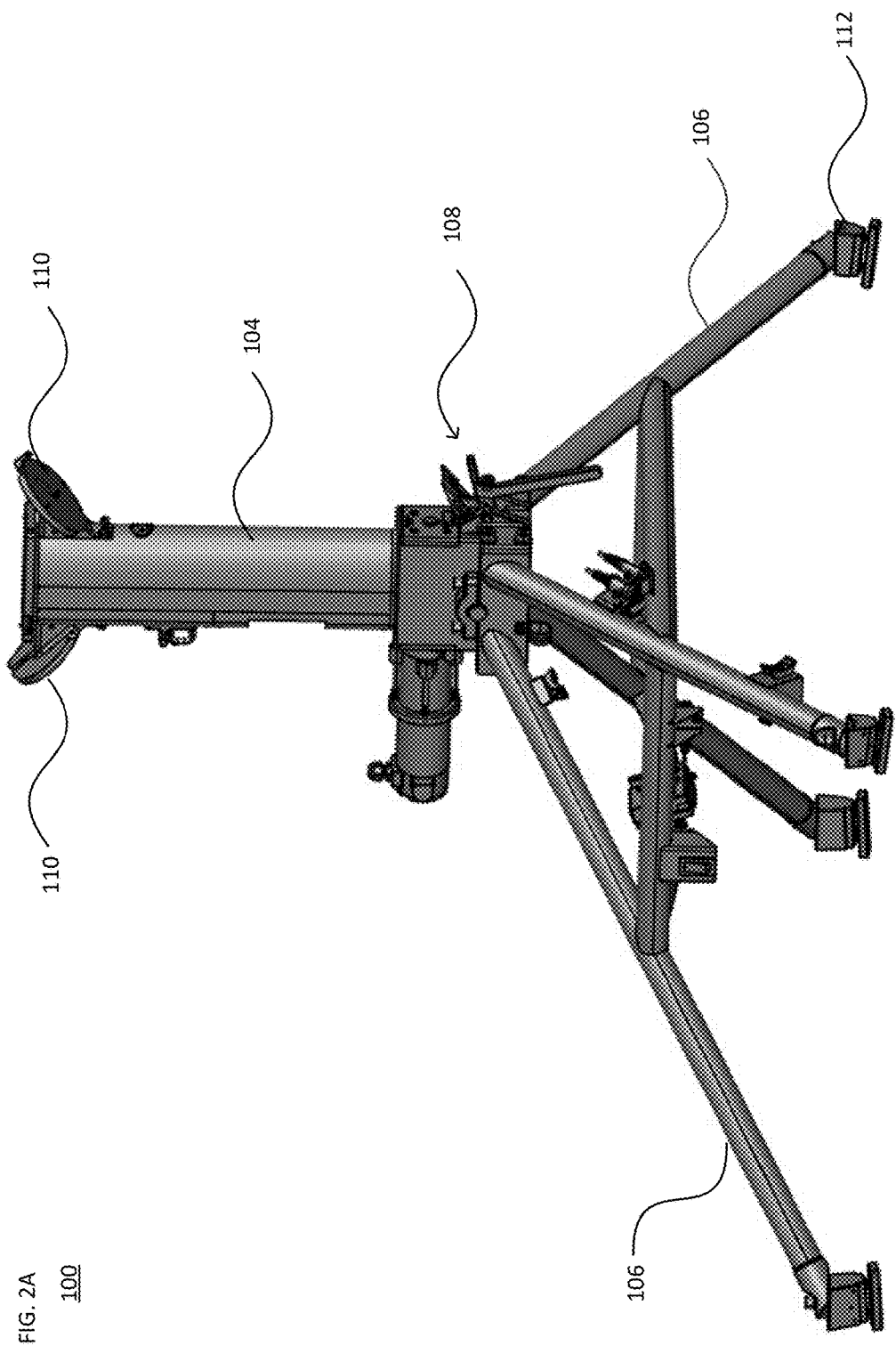

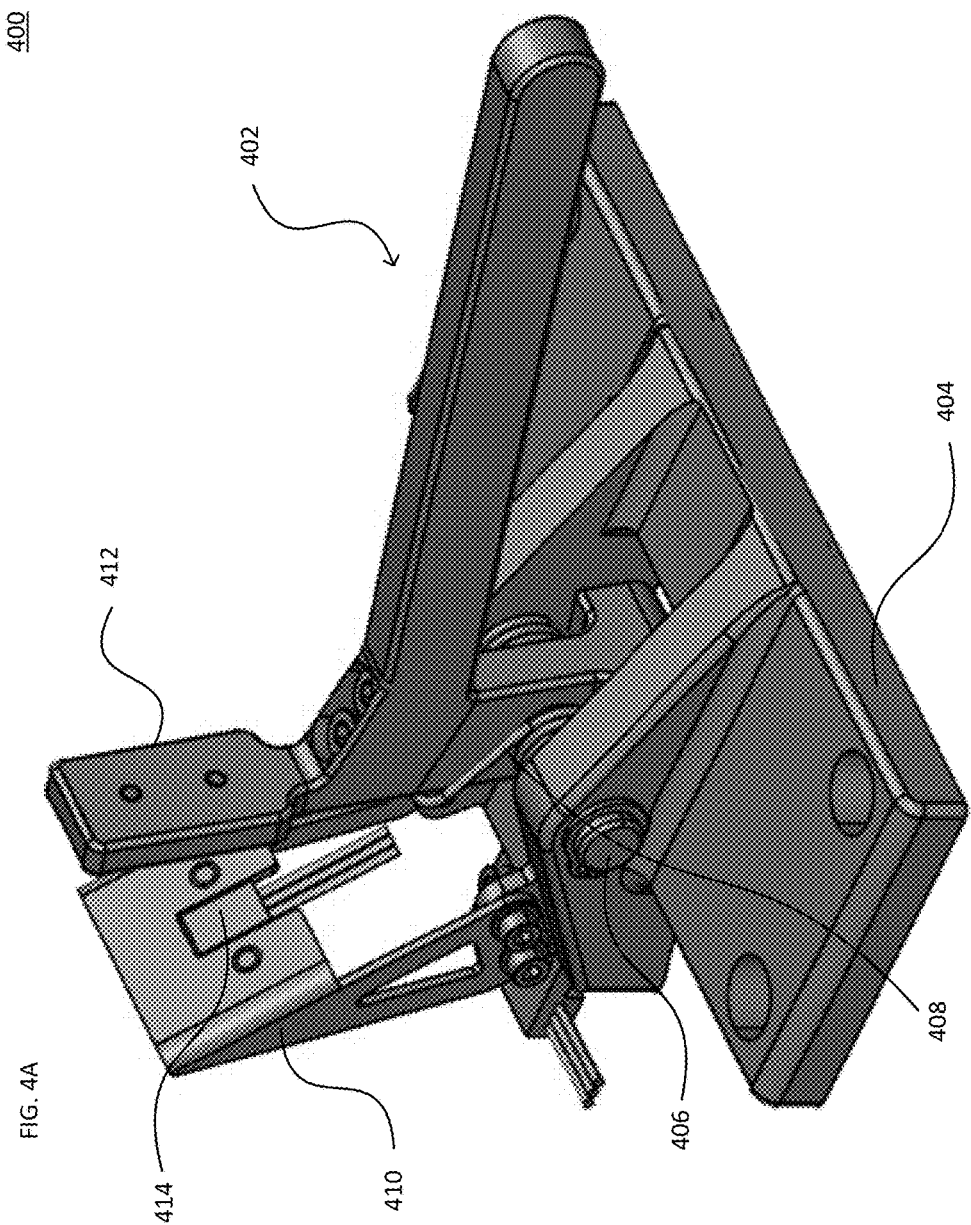

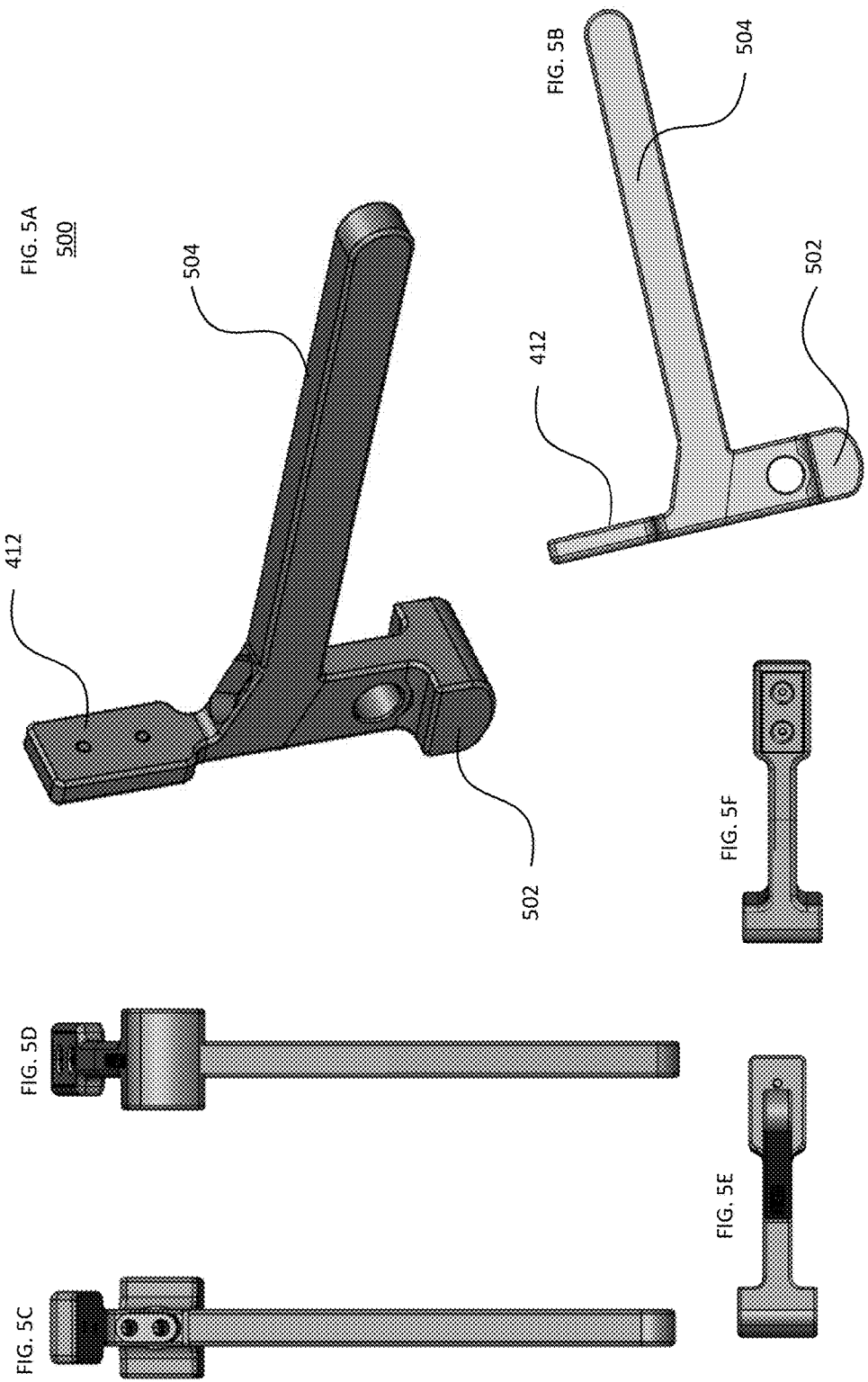

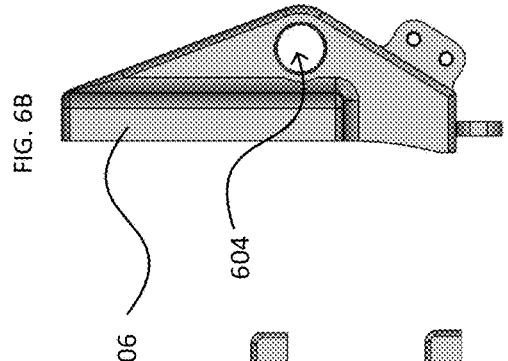
FIG. 6B
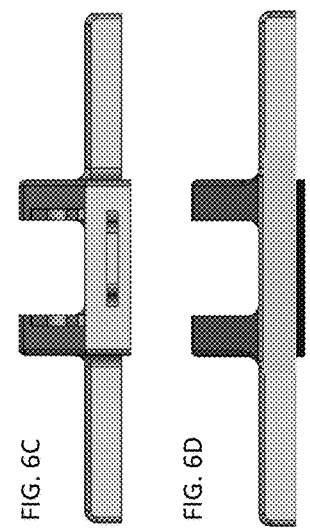
FIG. 6C
FIG. 6D
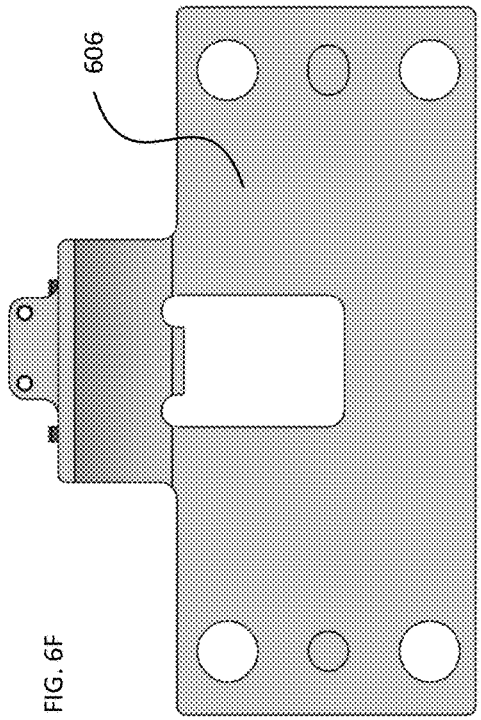
FIG. 6F
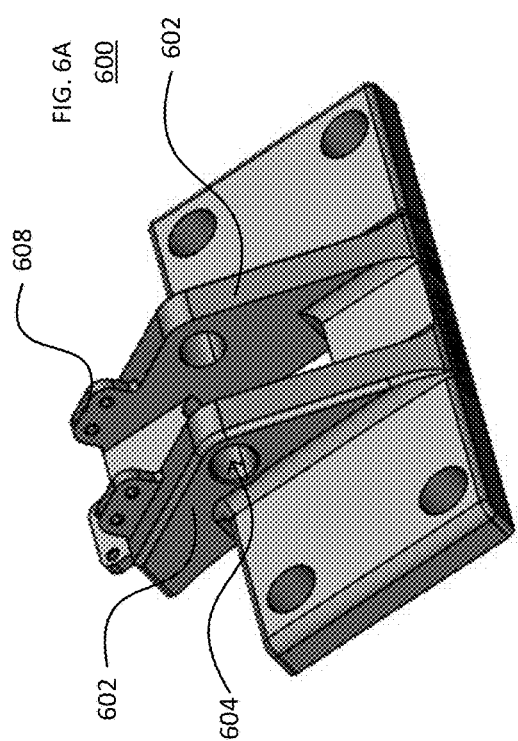
FIG. 6A
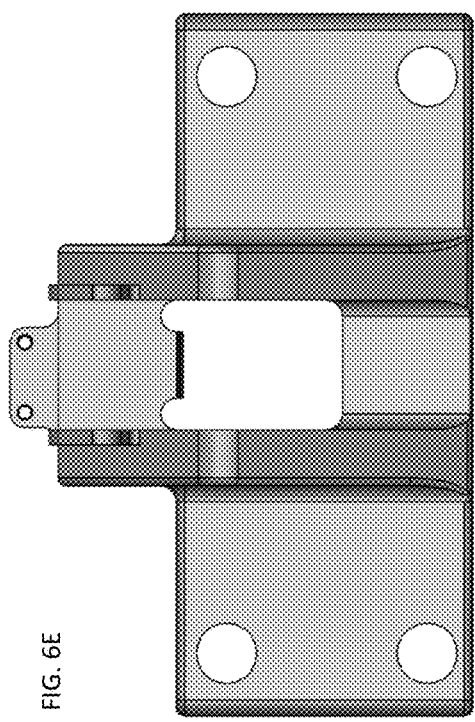
FIG. 6E

800

700

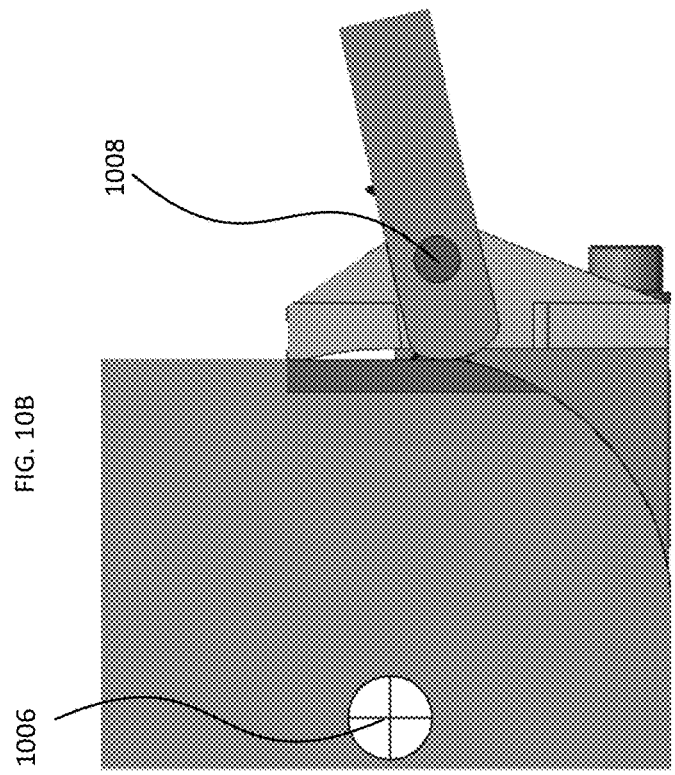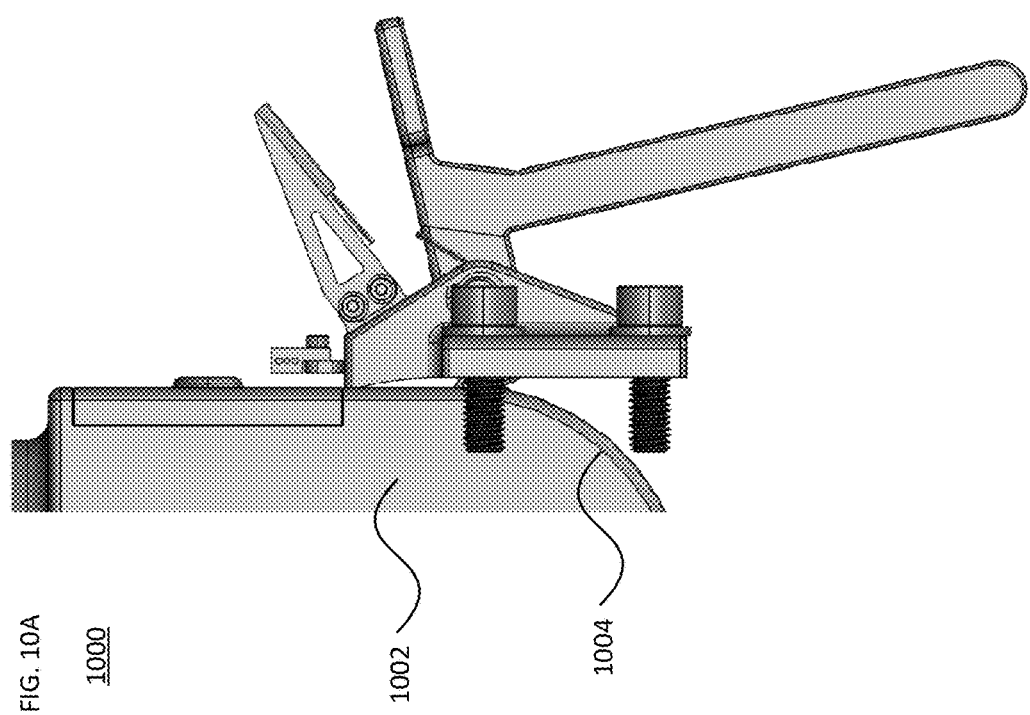

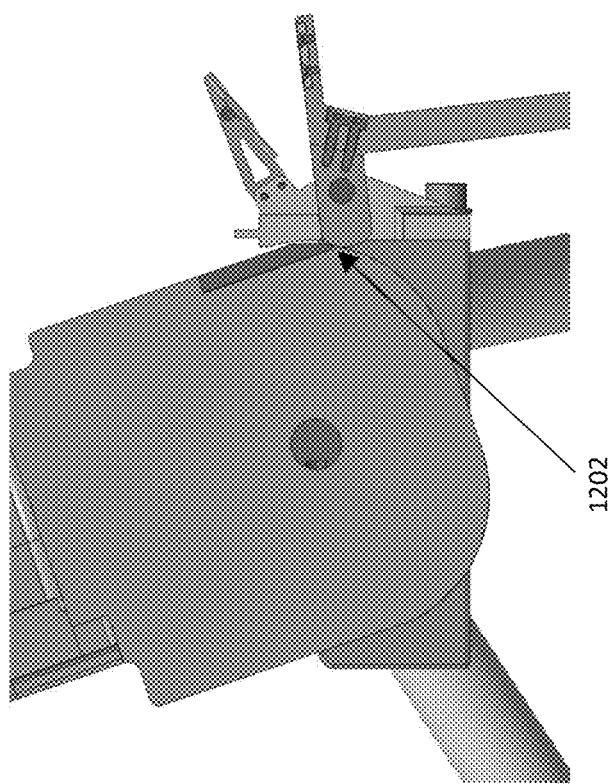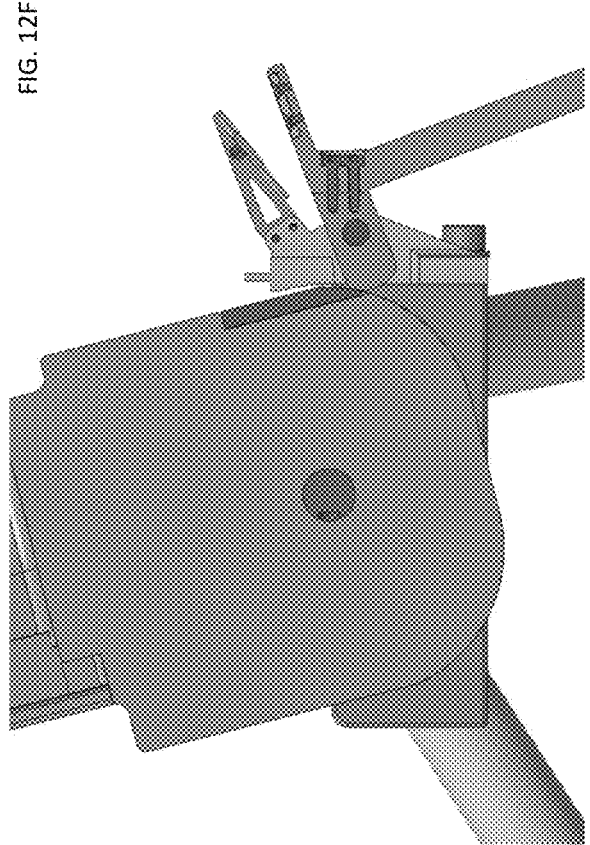

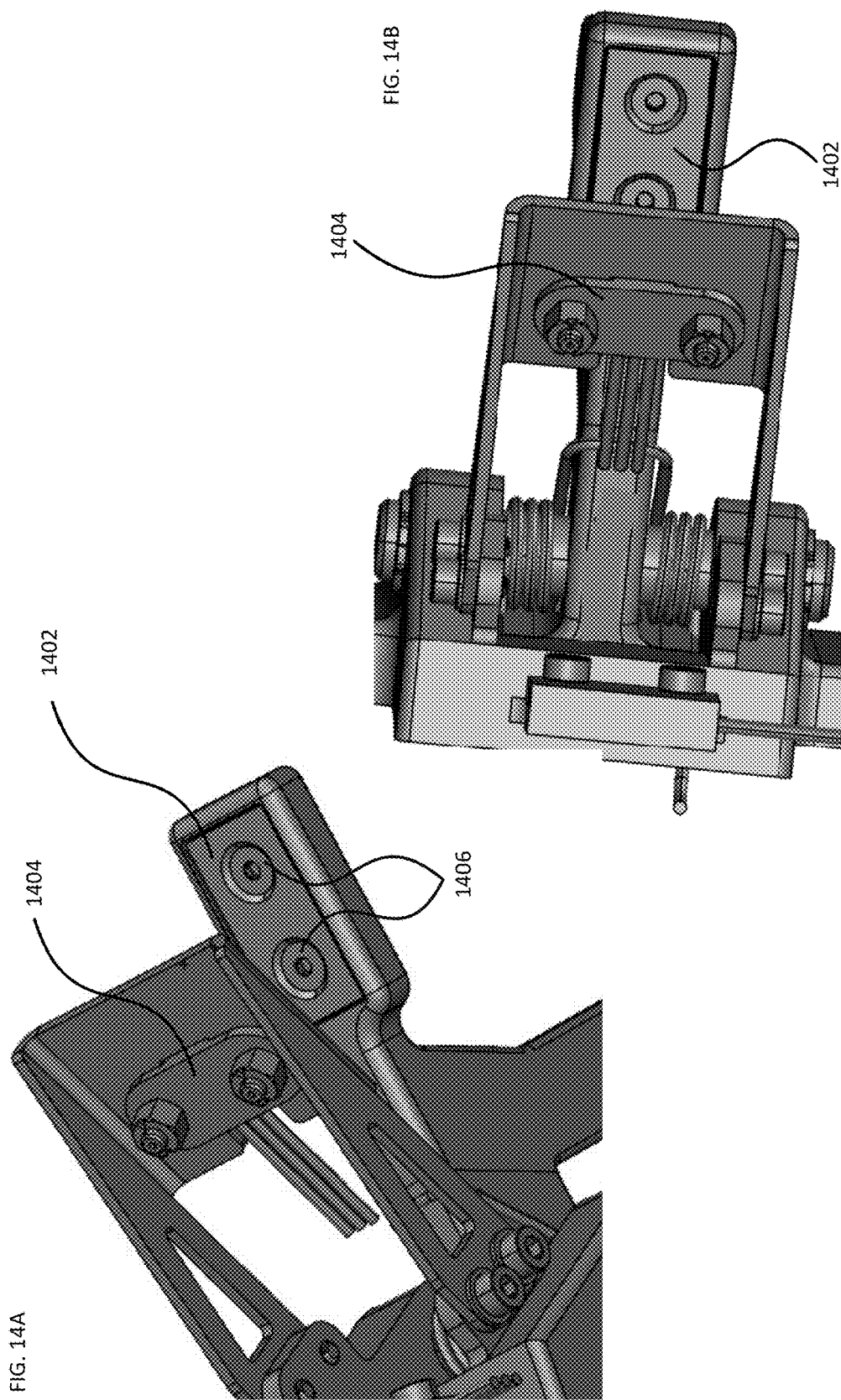

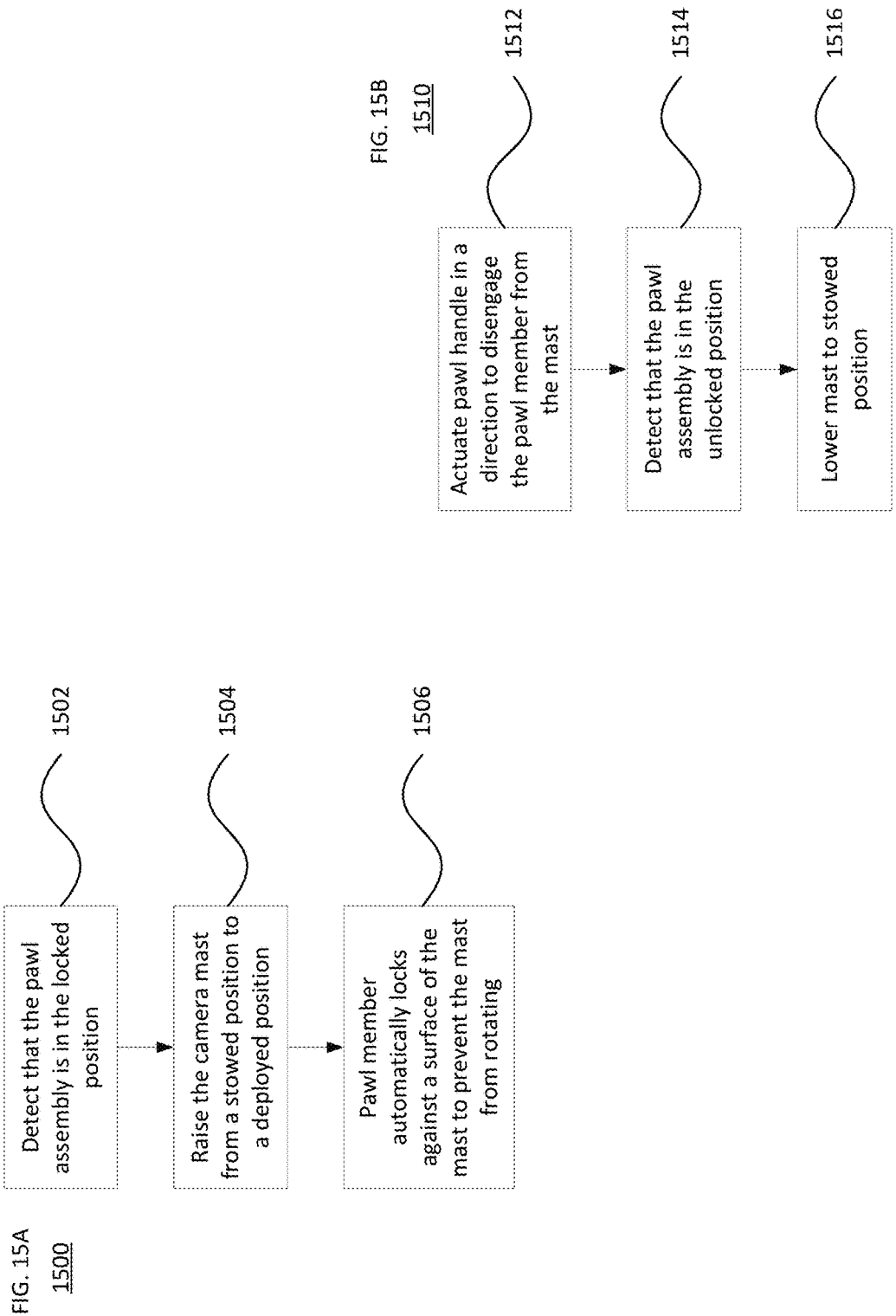

RELEASABLE ZERO BACKLASH PASSIVE LOCKING MECHANISM FOR A VEHICLE MOUNTED ROTARY CAMERA MAST

BACKGROUND

Certain applications, such as mapping and imagery for street-based panoramas, involve deploying a camera mounted on a moving vehicle. In such situations, a camera mast holding the camera is affixed to the vehicle to provide a better position and clearer lines of sight. Other components such as LIDARs may also be mounted along the camera mast. There needs to be some way to lock the mast in an upright, vertically deployed position during use. Typical latches and locking mechanisms may either allow backlash in the joint or are actively locked. Active locking may require user intervention or additional components to secure the mast in place. This can be cumbersome, add cost and/or complexity, and degrade the structural integrity due to backlash of the mast during use.

BRIEF SUMMARY

The technology described herein provides a locking mechanism having a stiff joint in the camera mount structure, which provides for zero backlash. The mechanism locks without user interaction and without an additional electro-mechanical device, meaning the device locks passively. The mechanism is releasable as it can be easily engaged and disengaged. This approach, which is discussed in more detail below, has several key advantages. For instance, it provides a joint that does not gap under dynamic load. This results in a higher natural frequency of the mast structure, which effectively means the assembly is more rigid than a conventional structure. Also, the joint does not require any additional action to lock. Rather, the motion of the mast moving to the fully deployed state automatically locks the joint. The joint should also be manually releasable with minimal effort. This provides an easy to use, secure and stable camera support structure that can be quickly deployed and stowed.

According to aspects of the disclosure, a zero backlash locking assembly is provided for use with a mast support structure of a vehicle. The locking assembly includes a mast stop member, a pawl member, a shaft member and a torsion spring. The mast stop member is configured for affixation to the mast support structure. The mast stop member includes at least one receptacle arranged along a first axis. The mast stop member has a first surface that prevents an elongated mast of the mast support structure from rotating in a first direction. The pawl member has a first end, a second end remote from the first end, and a receptacle disposed between the first end and the second end. The first end is configured to releasable engage a surface of the elongated mast. The receptacle is aligned with the at least one receptacle of the mast stop member along the first axis. The second end is configured to selectively disengage the first end of the pawl member from the surface of the elongated mast so that the elongated mast is rotatable about a second axis different from the first axis. Rotation about the second axis is only permitted in a second direction opposite the first direction. The shaft member is received by the at least one receptacle of the mast stop member and the receptacle of the pawl member along the first axis. And the torsion spring is received along the shaft member and couples to the pawl member. The torsion spring secures the first end of the pawl member against the surface of the elongated mast in a deployed state with zero backlash.

In one example, the locking assembly further includes a sensor member. The sensor member has a sensor bracket and a sensor affixed to the sensor bracket. The sensor is configured to detect whether an engagement member of the pawl member is in adjacent proximity to the sensor bracket to indicate that the pawl member is in an unlocked position relative to the surface of the elongated mast. Here, the engagement member may include a magnet. In this scenario, the sensor bracket is ferromagnetic to stick to the magnet, and the sensor is a Hall Effect sensor.

In another example, the second end of the pawl member comprises an elongated handle. In a further example, in the deployed state the elongated mast has a first alignment substantially perpendicular to a roof surface of the vehicle or to a ground surface. Here, the first alignment is maintained with the first end of the pawl member secured against the surface of the elongated mast.

In yet another example, in a disengaged state the first end of the pawl member does not contact the surface of the elongated mast. In this situation, in the disengaged state the elongated mast is rotatable from the first alignment to a second alignment, the second alignment being between about 90-120° relative to the first alignment.

In one alternative, the torsion spring includes two coiled spring sections arranged around the shaft member. In another alternative, the mast stop member includes a pair of brackets. In this case, each bracket includes a receptacle aligned along an axis and the shaft member is received in the receptacles of the pair of brackets.

In a further alternative, the locking assembly also includes a sensor bracket having a pair of arm members extending from a plate member. In this case, each mast stop member includes a flange element. Each flange element is secured to one of the pair of arm members of the sensor bracket.

According to other aspects of the disclosure, a system for mounting to a vehicle is provided. The system comprises a mast structure and a locking mechanism. The mast structure includes a mast and a support frame secured to the mast. The support frame is arranged for affixation to a vehicle. The locking mechanism includes a mast stop member, a pawl member, a shaft member and a torsion spring. The mast stop member is configured for affixation to the mast structure. The mast stop member includes at least one receptacle arranged along a first axis. The mast stop member has a first surface that prevents the mast from rotating in a first direction. The pawl member has a first end, a second end remote from the first end, and a receptacle disposed between the first end and the second end. The first end is configured to releasable engage a surface of the mast. The receptacle is aligned with the at least one receptacle of the mast stop member along the first axis. And the second end is configured to selectively disengage the first end of the pawl member from the surface of the mast so that the mast is rotatable about a second axis different from the first axis. Rotation about the second axis is only permitted in a second direction opposite the first direction. The shaft member is received by the at least one receptacle of the mast stop member and the receptacle of the pawl member along the first axis. The torsion spring is received along the shaft member and is coupled to the pawl member. The torsion spring secures the first end of the pawl member against the surface of the mast in a deployed state with zero backlash.

In one example, the locking mechanism further includes a sensor member. The sensor member has a sensor bracket and a sensor affixed to the sensor bracket. The sensor is configured to detect whether an engagement member of the pawl member is in adjacent proximity to the sensor bracket to indicate that the pawl member is in an unlocked position relative to the surface of the mast. In another example, the second end of the pawl member comprises an elongated handle. In a further example, in the deployed state the mast has a first alignment substantially perpendicular to a roof surface of the vehicle or to a ground surface, and the first alignment is maintained with the first end of the pawl member secured against the surface of the mast.

In another example, in a disengaged state the first end of the pawl member does not contact the surface of the mast. Here, in the disengaged state the mast is rotatable from the first alignment to a second alignment. The second alignment may be between about 90-120° relative to the first alignment.

In accordance with other aspects of the disclosure, a method of operating a zero backlash locking assembly is provided. The method comprises detecting that a pawl assembly of the locking assembly is in a locked position relative to an elongated mast, upon detecting the locked position, raising the elongated mast from a stowed position to a deployed position, and automatically locking the mast in the deployed position by impinging a first end of the pawl assembly against a surface of the elongated mast. A torsion spring secures the first end of the pawl assembly against the surface of the mast with zero backlash.

In one example, the method further comprises actuating a handle of the pawl assembly in a direction to disengage the first end of the pawl assembly from the surface of the elongated mast. Upon disengagement, the pawl assembly is temporarily retained in an unlocked state. In this situation, method may further include, upon disengagement and the pawl assembly being retained in the unlocked stated, rotating the elongated mast from the deployed position to the stowed position.

BRIEF DESCRIPTION OF THE DRAWINGS

Accompanying this specification is a set of drawings illustrating various features and aspects of the technology. In the drawings, like reference numerals refer to like elements. A brief discussion of each drawing is provided below.

FIGS. 2A-B illustrate examples of the camera mast assembly of FIGS. 1A-B according to aspects of the disclosure.

FIGS. 4A-B illustrate features of the locking mechanism of FIGS. 3A-B in accordance with aspects of the disclosure.

FIGS. 5A-F illustrate a pawl assembly in accordance with aspects of the disclosure.

FIGS. 6A-F illustrate a mast stop member in accordance with aspects of the disclosure.

FIGS. 10A-C illustrate examples of the camera mast assembly locked in position with a locking mechanism in accordance with aspects of the disclosure.

FIGS. 12A-J illustrate geometry interference between a pawl member of a locking mechanism and a camera mast in accordance with aspects of the disclosure.

FIGS. 14A-D illustrate examples of a pawl sensor arrangement in accordance with aspects of the disclosure.

FIGS. 15A-B illustrate flow diagrams of exemplary methods of operation in accordance with aspects of the disclosure.

The following description is based on embodiments of the claims and should not be taken as limiting the claims with regard to alternative embodiments that are not explicitly described herein.

DETAILED DESCRIPTION

Overview

As explained in more detail below, the assembly includes a rotary locking joint that has zero backlash, is passive to lock, and is still releasable for use on a vehicle mounted deployable camera mast. In particular, the joint prevents rotation in one direction, and there is a hard stop element that prevents further rotation in the opposite direction. The deployable structure, e.g., a camera mast, includes a cylinder or other housing with a flat surface. The deployable structure is configured to rotate into another cylinder, in particular a surface of a locking pawl.

The locking pawl is arranged to rotate about a point (the pawl rotation axis) that is not coincident with the center of its cylinder, and is configured to contact the deployable structure on the flat surface of the deployable structure's cylinder. The locking pawl is spring loaded with a torsion spring or other tension element to ensure contact with the deployable structure. Upon a torque in the opposite direction on the mast, the geometry interference between an end of the locking pawl and the flat face of the deployable structure prevents motion and maintains contact due to the generated frictional force. To release the joint, the locking pawl is rotated in the opposite direction to remove the geometry interference condition.

Example Arrangement

Figure 1A:
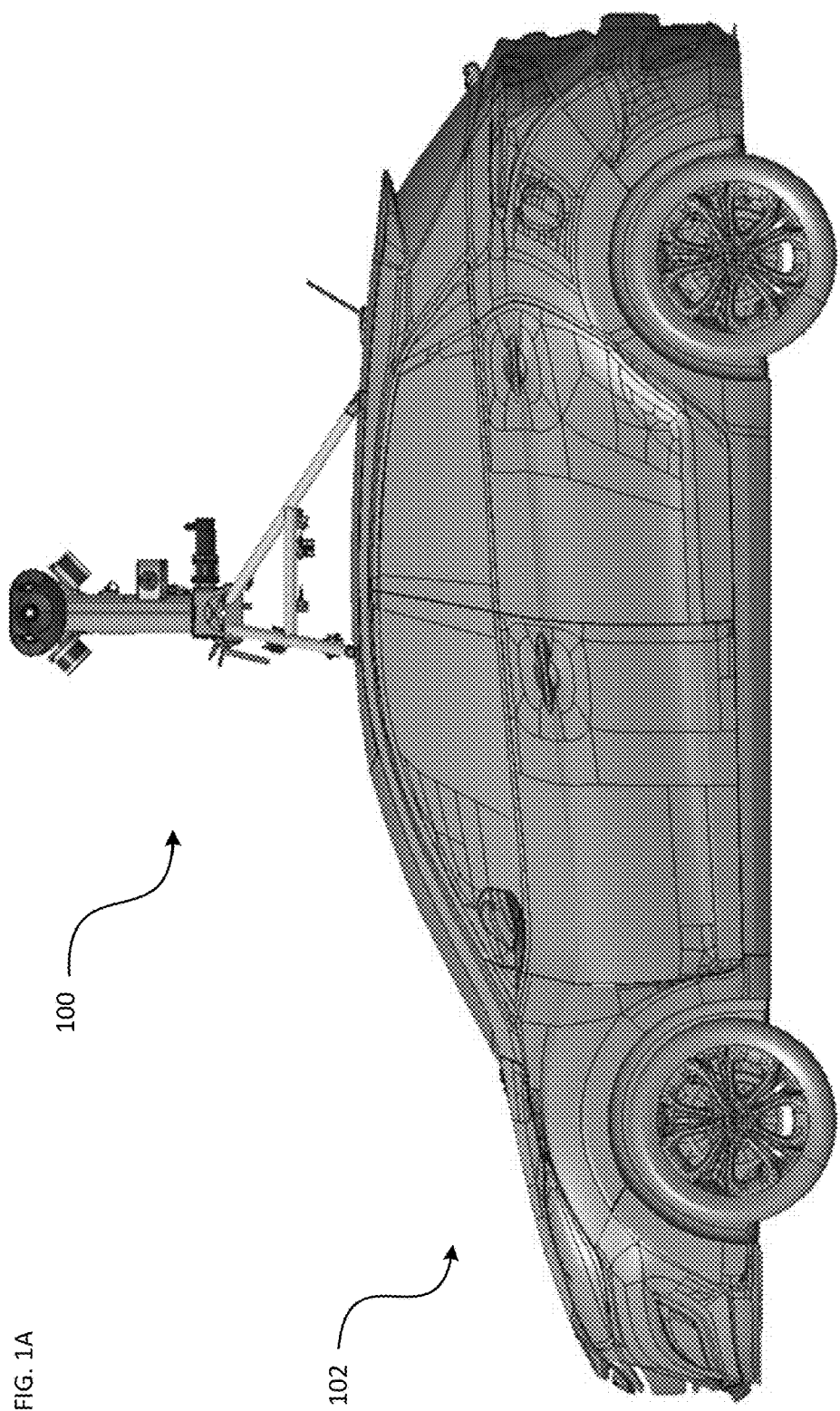
FIGS. 1A-B illustrate examples of a camera mast assembly and vehicle according to aspects of the disclosure.
Figure 1B:
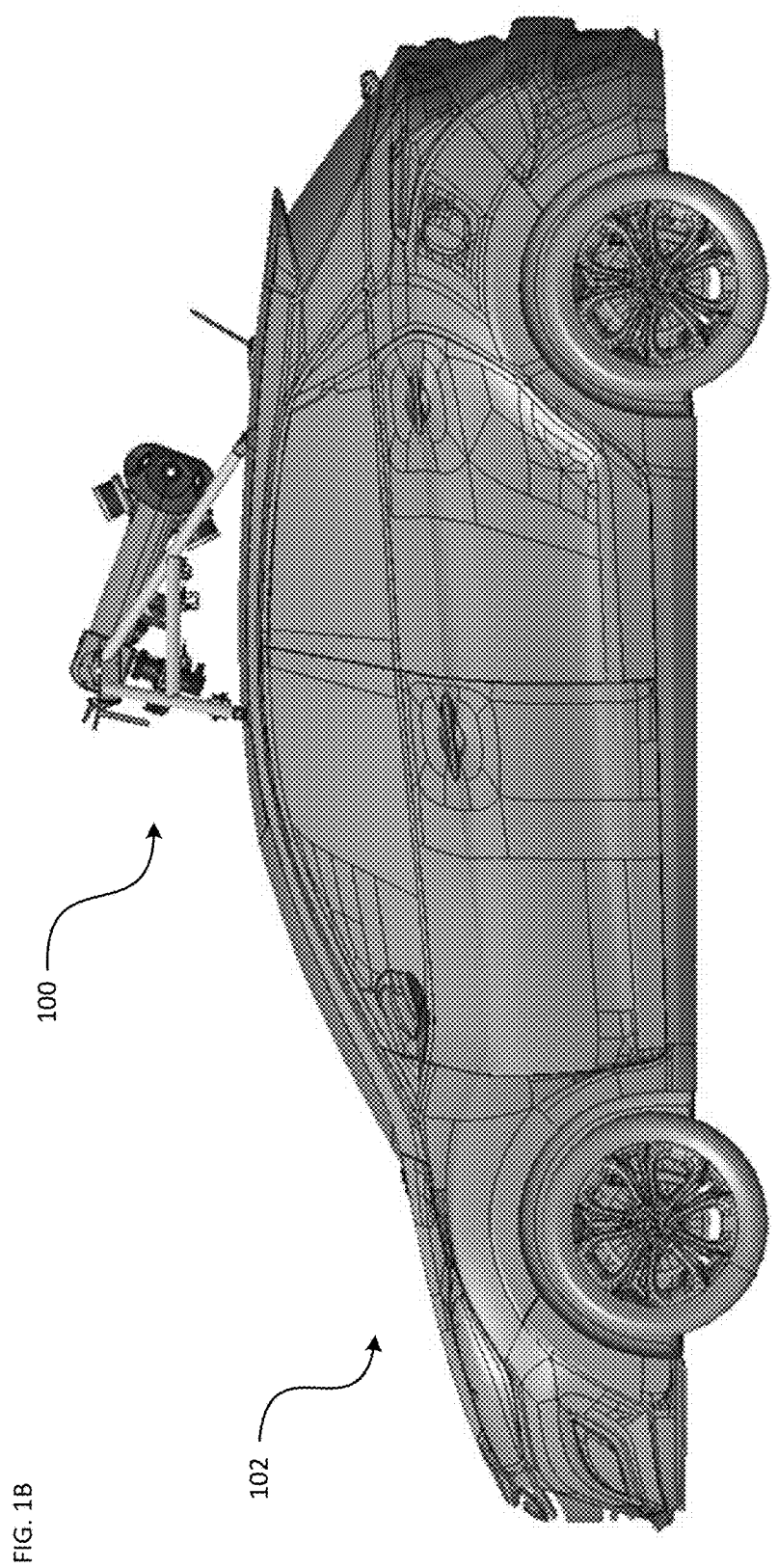
Figure 2B:
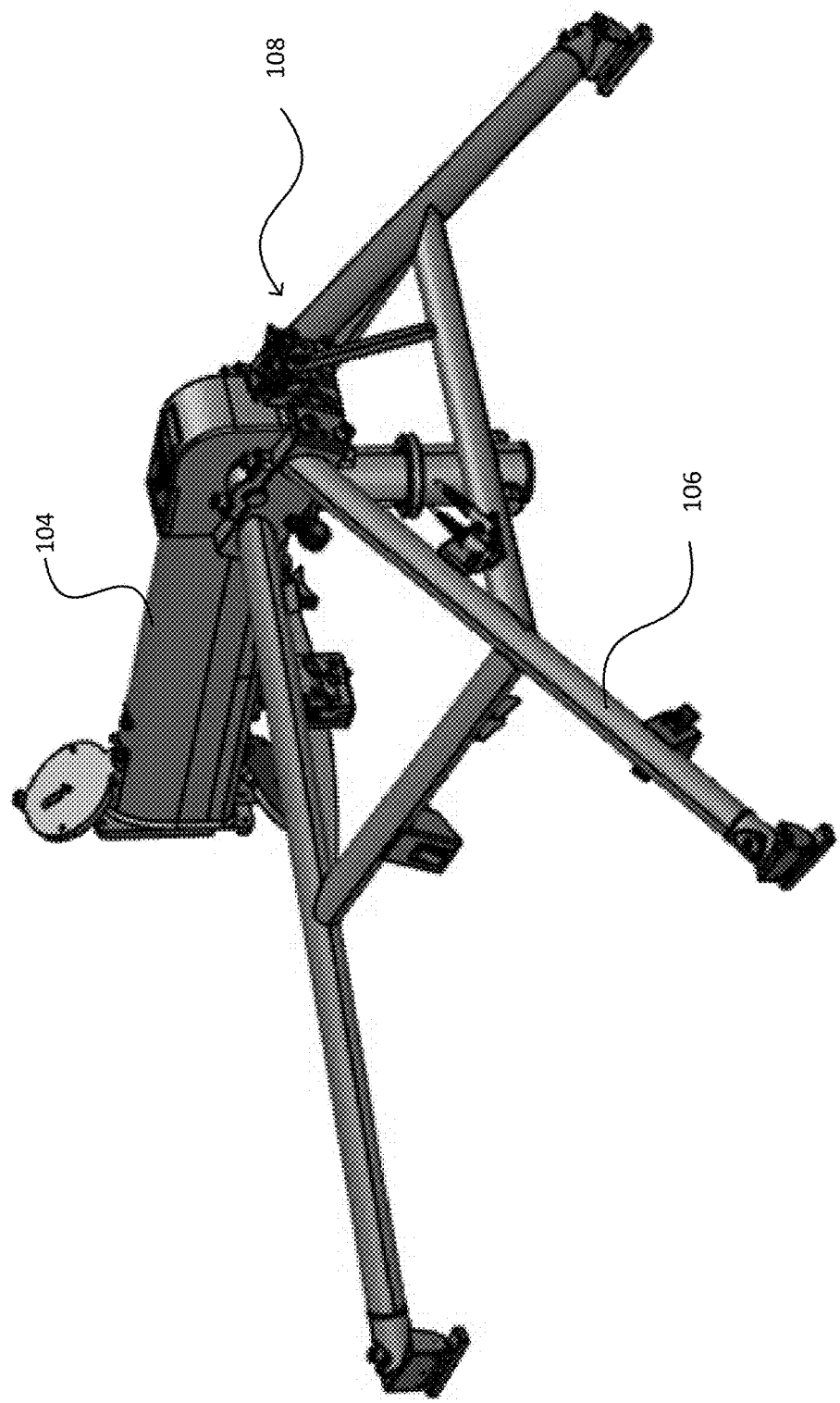

FIGS. 1A-B illustrate an example of camera mast assembly 100 in accordance with aspects of the disclosure. In particular, FIG. 1A illustrates the camera mast assembly 100 on a vehicle 102 in a deployed state, while FIG. 1B illustrates the camera mast assembly 100 in a stowed state. FIG. 2A illustrates a perspective view of the assembly 100 without the vehicle, while in the deployed state, and FIG. 2B illustrates the stand-alone assembly while in the stowed state. As shown, the assembly 100 includes a mast 104, a set of supporting frame braces 106, and a locking mechanism 108.

The mast 104 is configured to support one or more imaging devices (not illustrated in FIGS. 2A-B), which may be affixed to mounting members such as brackets 110. In one example, the imaging devices may be LIDARs. Other types of imaging devices, such as one or more cameras to generate panoramic images, may also be secured on the housing of the mast 104. As shown, the frame braces 106 may each include a connection member 112. The connection members 112 are arranged to be affixed to the vehicle 102, for instance by slotting into roof rails of the vehicle. Alternative affixation methods, such as bolting, suction, or securing with adhesive may alternatively be employed.

When in the deployed position, the camera mast needs to be secured so that it doesn't chatter as the vehicle is in motion. Chattering may be evidenced by a high frequency, low amplitude movement of the camera mast relative to a vertical position when in the deployed state shown in FIG. 1A. As noted above, the locking mechanism 108 is designed to provide zero backlash, which avoids chattering and other issues. Zero backlash is achieved with the following arrangement.

Figure 3B:
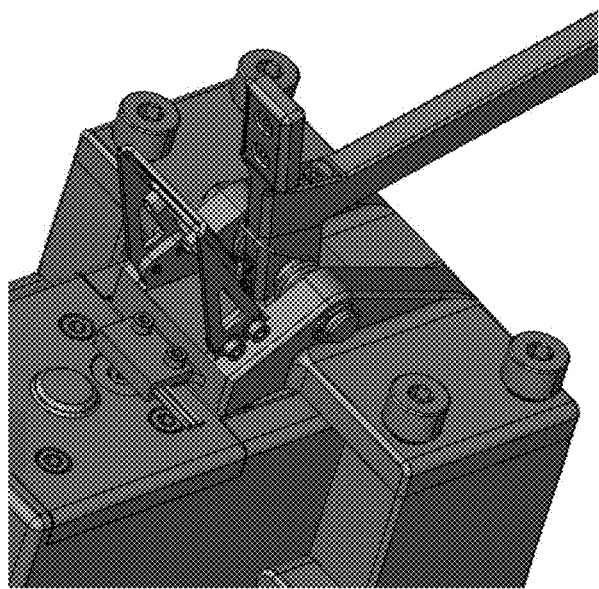
FIGS. 3A-B illustrate details of a camera mast and locking mechanism in accordance with aspects of the disclosure.
Figure 3A:
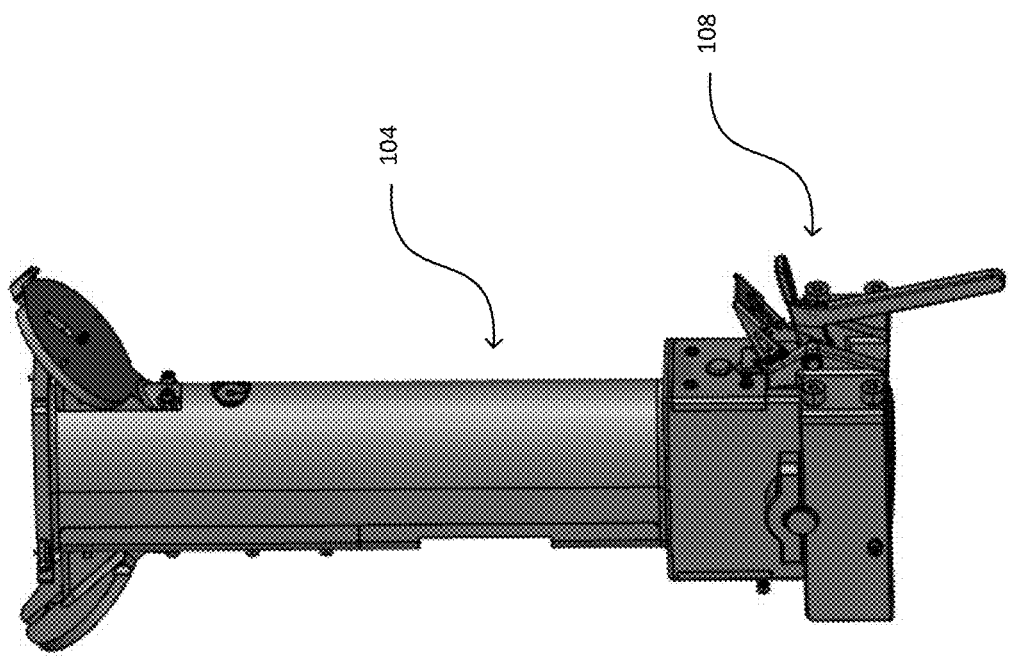

FIG. 3A illustrates a view of the locking mechanism 108 and the mast assembly 104 without the fame braces 106. FIG. 3B is a close-up view of the locking mechanism 108 coupled to a base section of the mast assembly 104, for instance using a set of bolts or other fasteners. These figures show a locked state when the mast assembly 104 is deployed, and will be discussed in detail below.

Figure 4B:
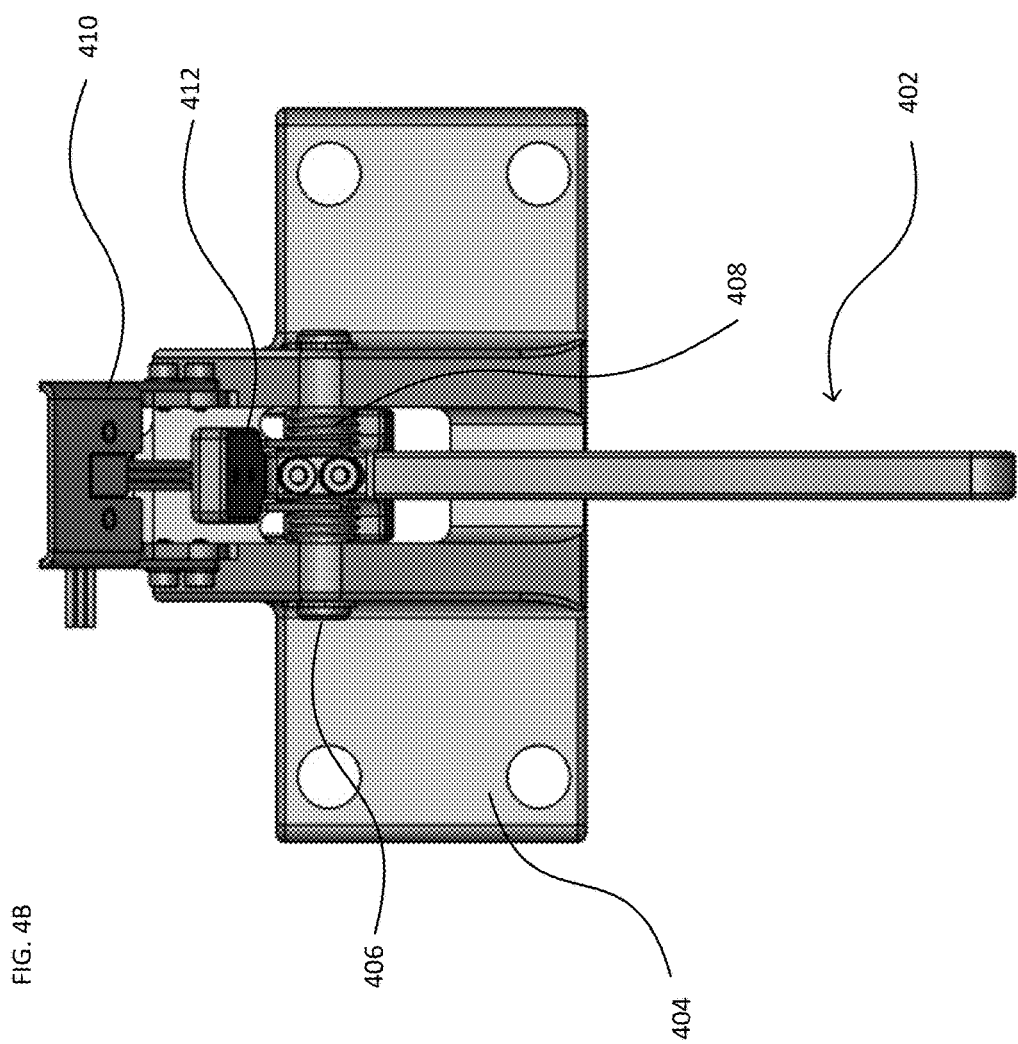
Figure 8A:
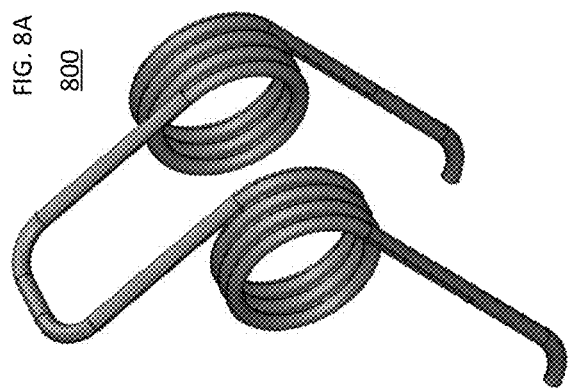
FIGS. 8A-D illustrate an example of a torsion spring in accordance with aspects of the disclosure.
Figure 8B:
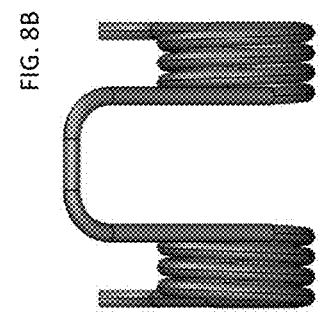
Figure 8C:
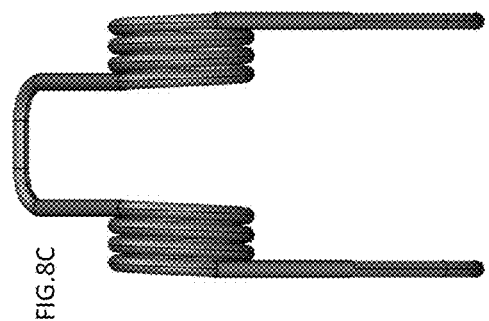
Figure 8D:
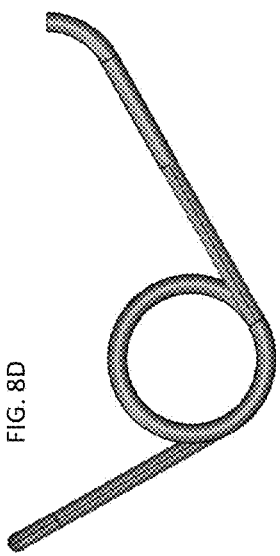

FIGS. 4A-B illustrate an example 400 of the locking mechanism by itself. In this example, there is a pawl assembly 402, which includes a pawl member and a pawl handle. A mast stop member 404 is coupled to the pawl member via a pawl shaft 406 and a torsion spring 408. A sensor bracket 410 is arranged to engage with an engagement member 412 of the pawl assembly 402. Sensor 414 is coupled to the sensor bracket 410, and is configured to sense whether there is engagement between the sensor bracket and the engagement member.

FIGS. 5A-9F illustrate various components of the locking mechanism. For instance, FIGS. 5A-F present various views of an example 500 of the pawl assembly 402. These figures illustrate pawl member 502 coupled to pawl handle 504. The engagement member 412 also couples to the pawl handle 504. FIGS. 6A-F illustrate an example 600 of the mast stop member 404. As shown, the mast stop member includes a pair of brackets 602 having a pair of holes aligned along an axis 604. The mast stop member also include a stop plate 606 coupled to the brackets 602. The mast stop member also includes a pair of flange elements 608 extending from the brackets 602. In one example, the pawl assembly and/or the mast stop member may each be formed as unitary components. In another example each may be formed from multiple components fastened together.

Figure 7A:
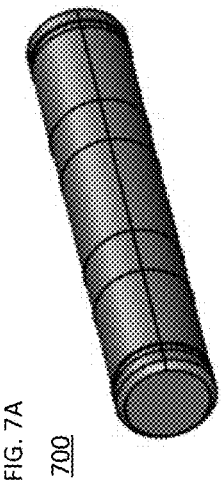
FIGS. 7A-C illustrate a pawl shaft in accordance with aspects of the disclosure.
Figure 7B:
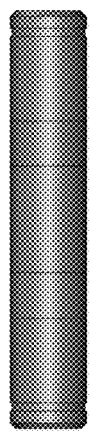
Figure 7C:
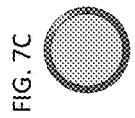
Figure 9C:
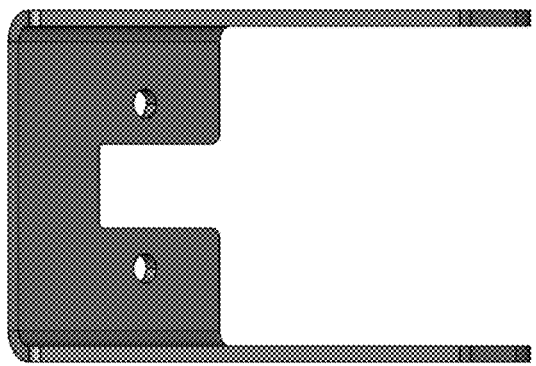
FIGS. 9A-F illustrate a sensor bracket in accordance with aspects of the disclosure.
Figure 9D:
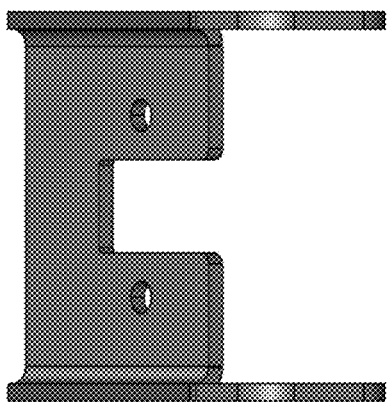
Figure 9E:
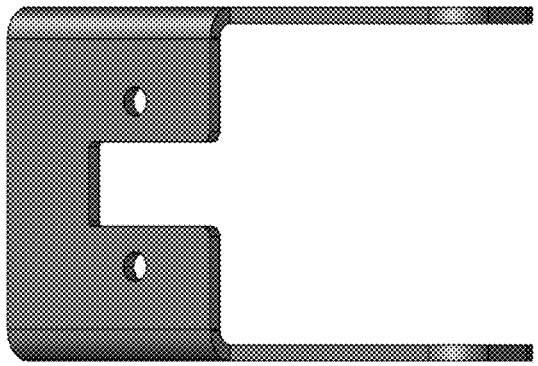
Figure 9F:
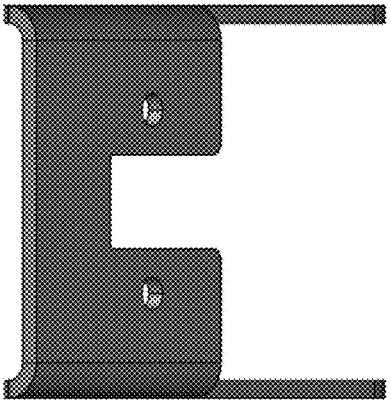
Figure 9A:
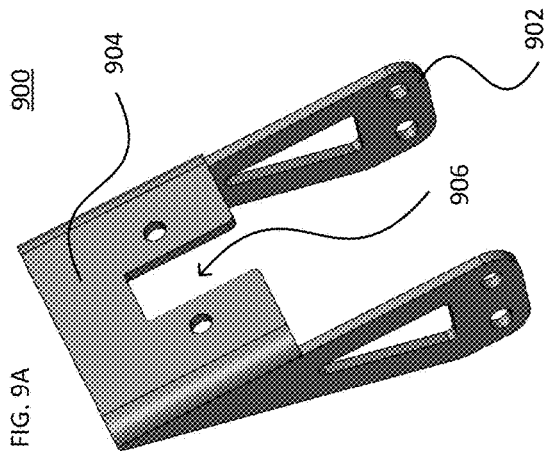
Figure 9B:
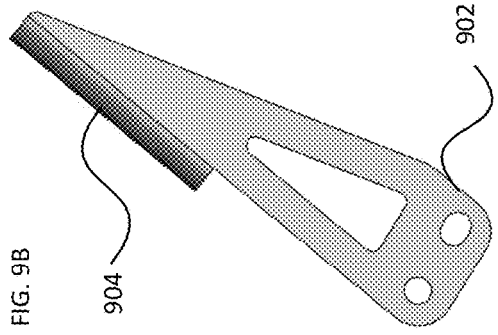

FIGS. 7A-C illustrate an example 700 of pawl shaft 406. The pawl shaft is adapted to fit through the pair of holes of the brackets 602 of the mast stop member, along the axis 604 (see FIG. 6B). The pawl shaft may be retained within the bracket holes by a pair of locking washers or other retention components (not shown). FIGS. 8A-D illustrate an example 800 of torsion spring 408. As shown in FIG. 4A, the torsion spring is arranged around the pawl shaft in between the brackets of the mast stop member. The torsion spring is operatively coupled to the pawl member, providing a biasing force as needed to passively lock the pawl member in place in the locked state. While the torsion spring as shown includes two complementary coiled spring sections, other arrangements are possible with only one spring section or more than two spring sections. Alternatively, a different spring device or a biasing member other than a torsion spring may be employed. In yet another scenario, the biasing member may be omitted entirely. In this case, gravity alone can keep the pawl assembly slightly biased, since the center of gravity of the pawl assembly is outboard of the pivot point. However, depending on system requirements, it may be desirable to employ a biasing member with a selected torque to ensure the locking member operates properly. For instance, the spring torque from the torsion spring is much larger than the torque from gravity.

FIGS. 9A-F illustrate an example 900 of the sensor bracket 410. The sensor bracket includes a pair of arm members 902 arranged to couple with the flange elements 608 of the mast stop member. The sensor bracket also includes a plate member 904, which is arranged to engage and disengage with the engagement member 412 of the pawl assembly. A slot 906 is arranged along the plate member 904. The sensor 414 (FIG. 4A) is omitted in these figures. Operation of the sensor bracket is discussed in more detail below.

Figure 10C:
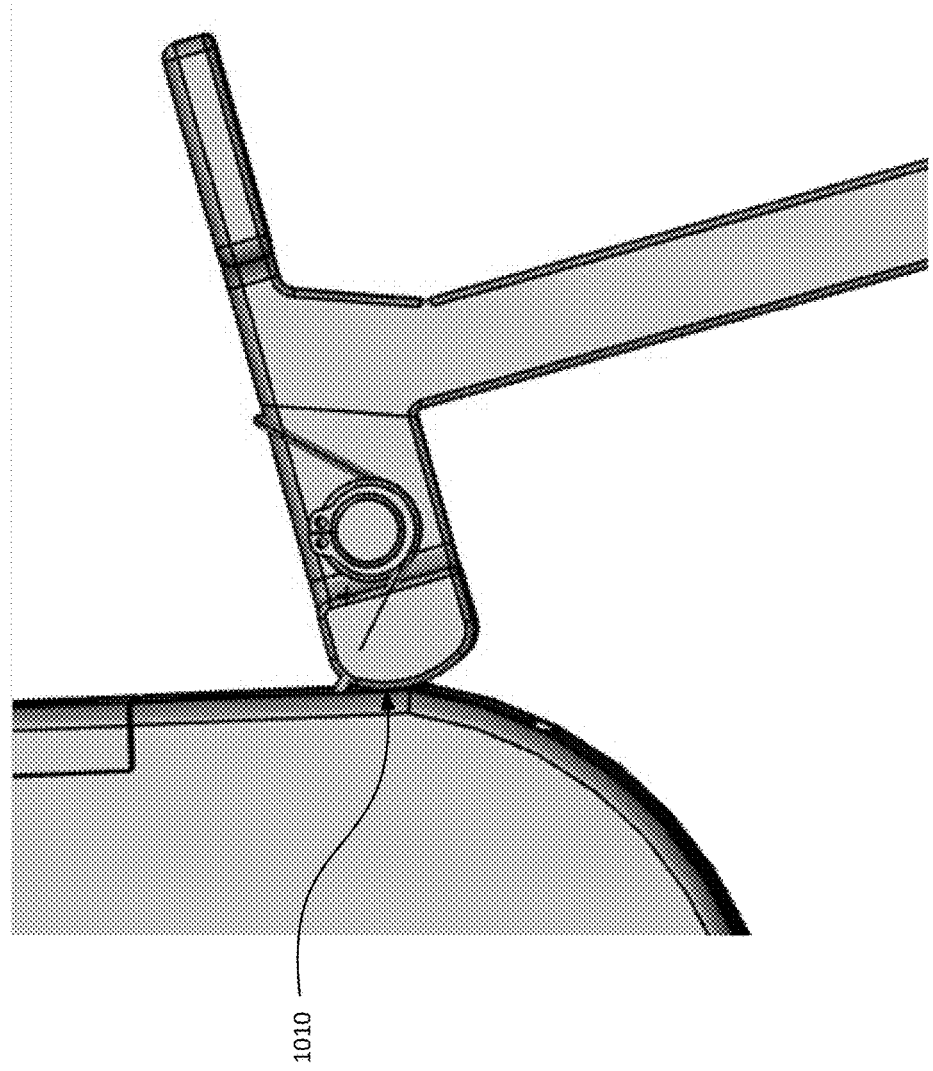

FIGS. 10A-C provides several views in order to illustrate an example of the locked state of the mast and pawl assembly. In particular, FIG. 10A is a partial view of an upper section of the camera mast assembly and the locking mechanism. Here, it can be seen that a base 1002 of the camera mast has a rounded end 1004. FIG. 10B shows that the base has a first pivot point 1006, while the pawl member is arranged about a different pivot point 1008. Pivot point 1008 corresponds to the pawl shaft, which is aligned along axis 604 (FIGS. 6A-B). FIG. 10C shows an alternate view in which the mast stop member and sensor bracket are omitted for clarity. Here, it can be seen that impingement point 1010 occurs where the pawl member contacts the base of the camera mast.

Figure 11A:
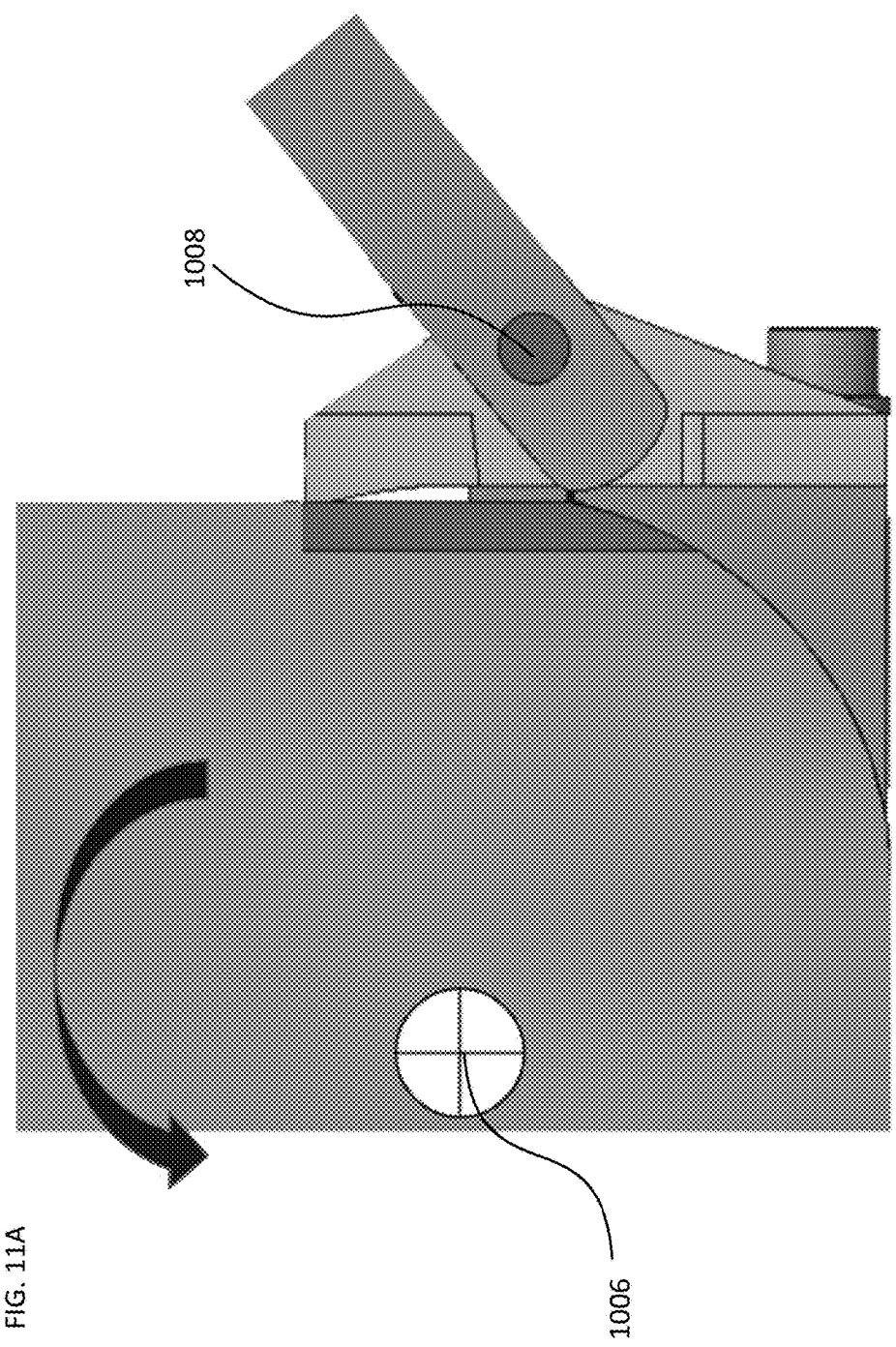
FIGS. 11A-C illustrate examples of the camera mast assembly in which the locking mechanism is disengaged in accordance with aspects of the disclosure.
Figure 11B:
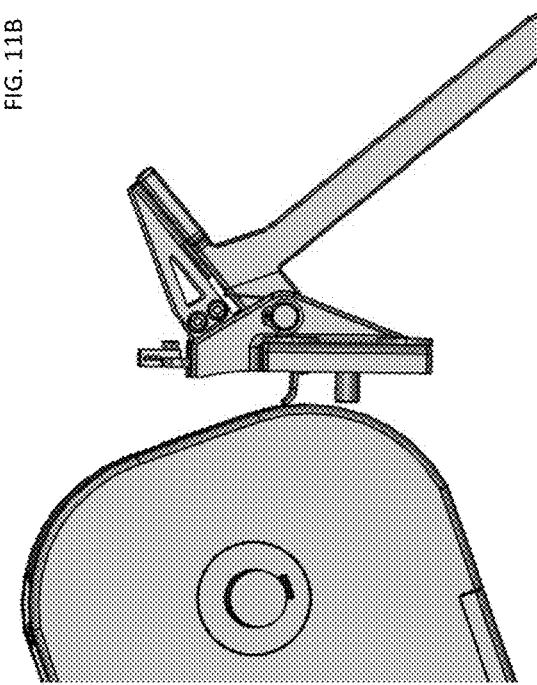
Figure 11C:
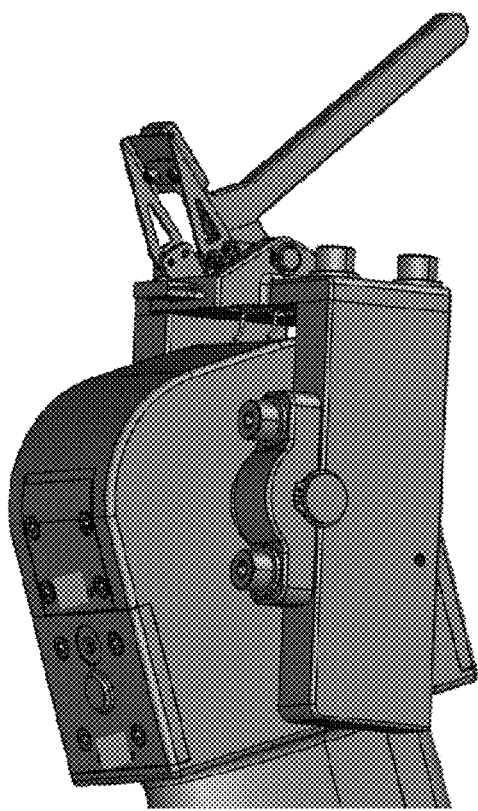

FIGS. 11A-C provide several views in order to illustrate an example of the unlocked state of the system. Here, when the pawl member is rotated about pivot point 1008, it disengages from the camera mast. This enables the camera mast to rotate counterclockwise (as shown in FIG. 11A) about the pivot point 1006. FIGS. 11B and 11C show views where the pawl member has been disengaged and the camera mast has been rotated. This enables the camera mast to be stowed.

Figure 12A:
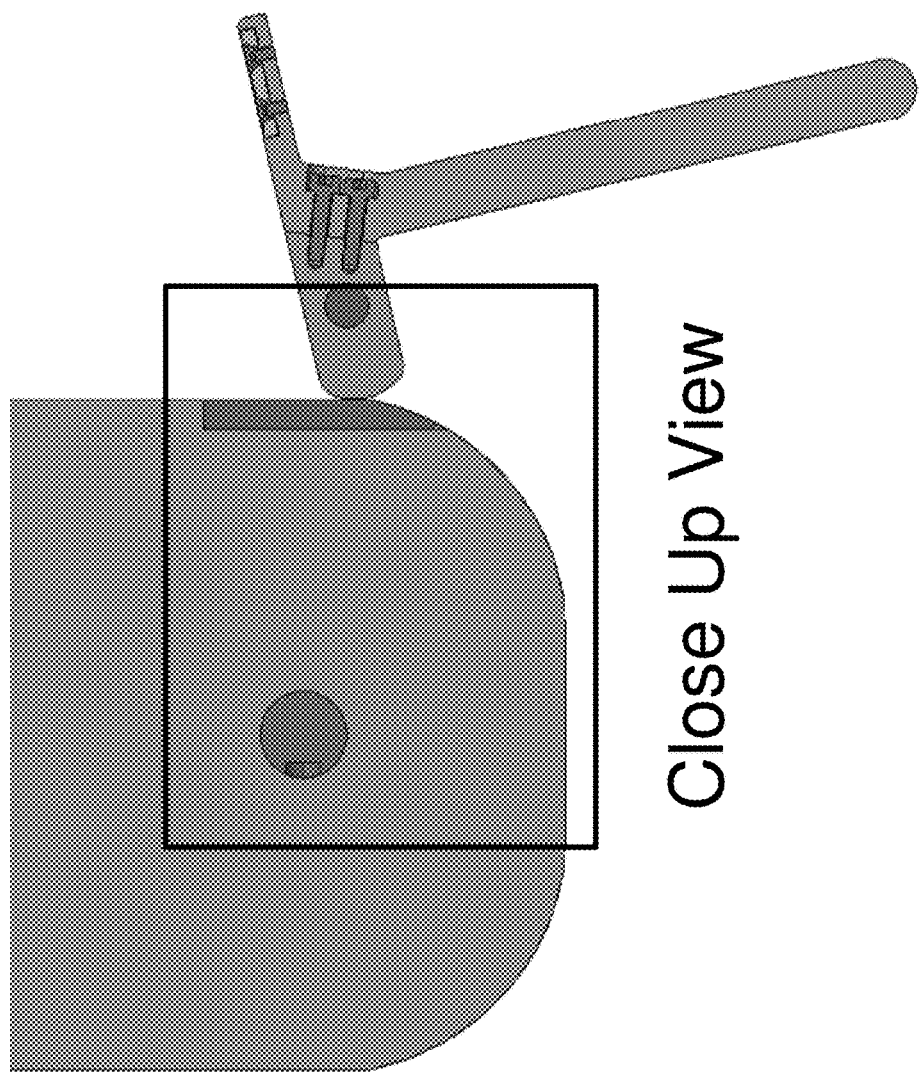
Figure 12B:
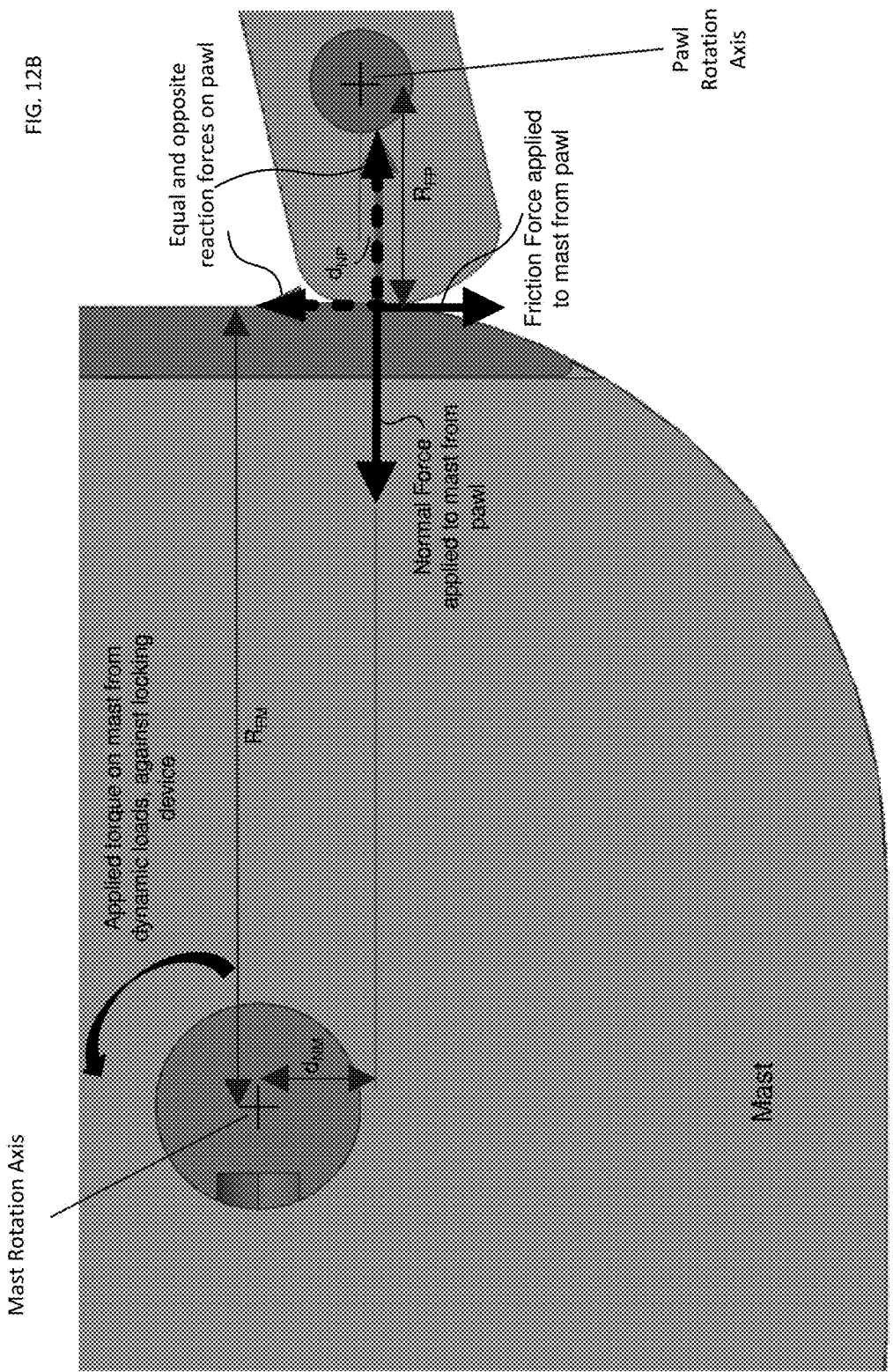

FIGS. 12A-B show an example of the pawl member and camera mast that illustrates the respective axes for each of these structures, and the different forces that account for a stiff joint with no perceptible backlash. FIG. 12A is cutaway view of a base section of the camera mast with the pawl impinging on it. FIG. 12B is an enlarged close-up view indicating the different forces at play and the radial distances between the mast and pawl rotation axes and the impingement point where the pawl contacts the surface of the mast. Having the stiff joint is important because if the mechanism is a soft joint or has backlash, the lower natural frequencies of the system will have the result of amplifying the loads (e.g., the camera and other components attached to the free end of the camera mast) and can accelerate a structural failure. FIGS. 12C-J illustrate an example of the interaction of the mast and pawl during deployment.

As can be seen from FIGS. 10-12, the pawl member is arranged to rotate about a point (the pawl rotation axis 1008) that is not coincident with the center of the pawl member's cylinder. In addition, the pawl member is configured to contact the deployable structure on the flat surface of the deployable structure's cylinder.

In one scenario, the mast may be raised using a motor and gear arrangement, in which the mast moves from a stowed position to a fully deployed position. Other mechanisms may be used to raise the mast besides a motor and gears. As seen in FIG. 1A, the fully deployed position may have the camera mast in a substantially vertical orientation relative to the roof of the vehicle or relative to a ground surface such as a roadway. In other implementations, the fully deployed position may be less than substantially vertical. Nonetheless, the motion of the mast moving to the fully deployed state automatically locks the pawl member relative to the mast.

The pawl assembly must be in the locked position prior to deployment for it to automatically lock when deployed. During deployment, the motion of the mast makes contact with the pawl member when it's in the down (or locked) state. The mast and pawl both rotate, with the spring ensuring contact between the two, until the mast reaches the hard stop, at which point the pawl point of contact has moved from the cylindrical portion of the mast to the flat portion. This is illustrated in FIGS. 12C-J, where the torsion spring and other components are omitted for clarity.

Figure 12C:
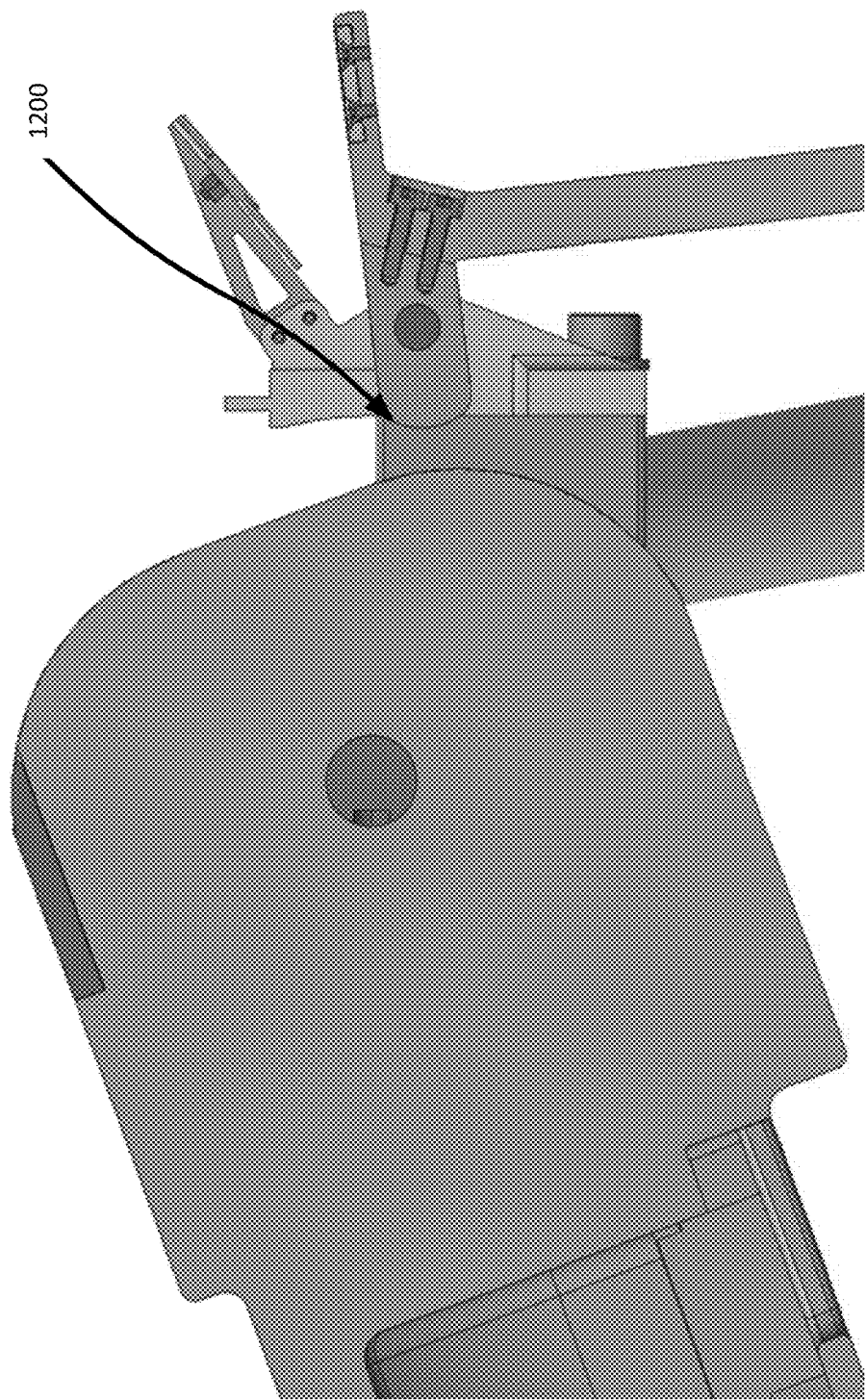
Figure 12D:
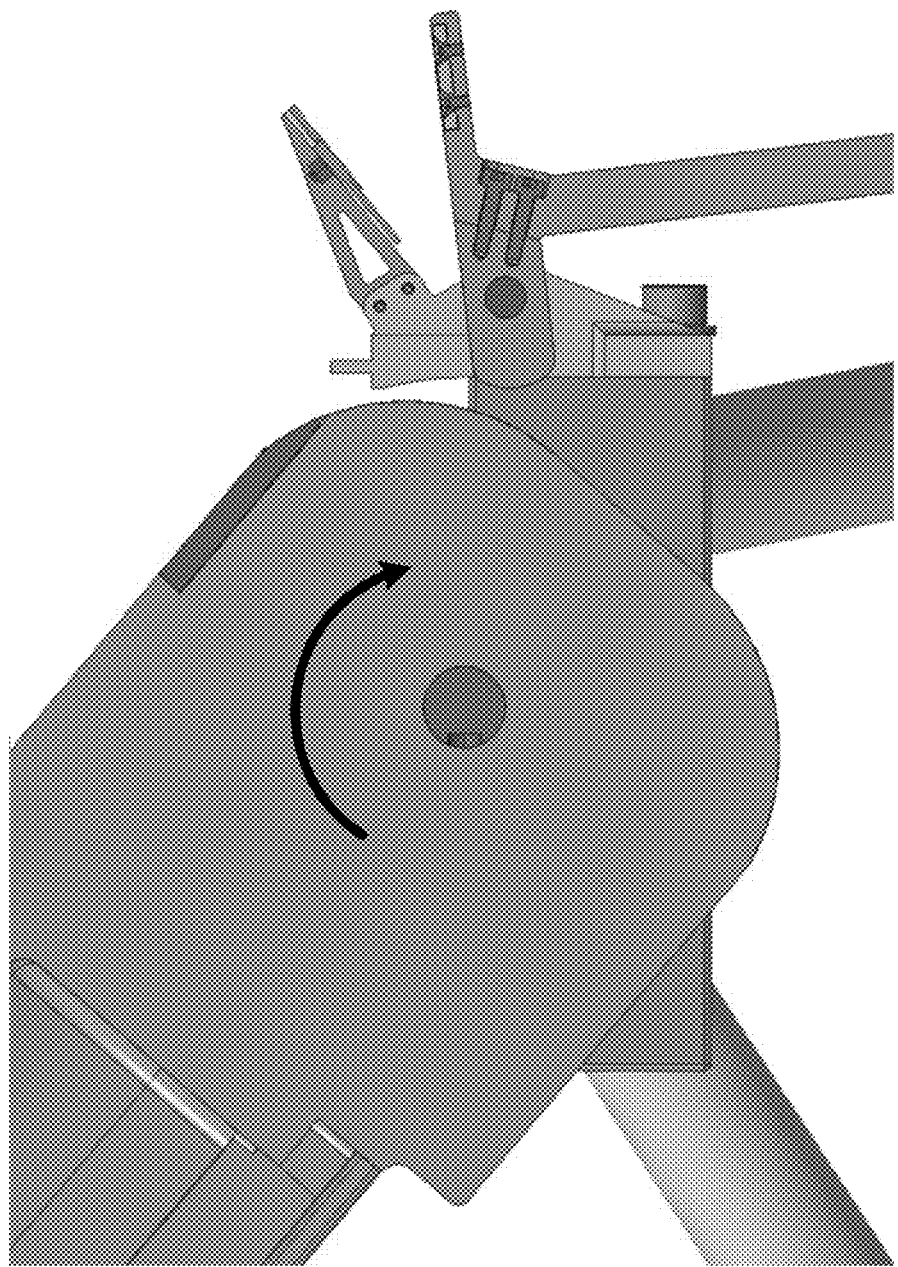
Figure 12G:
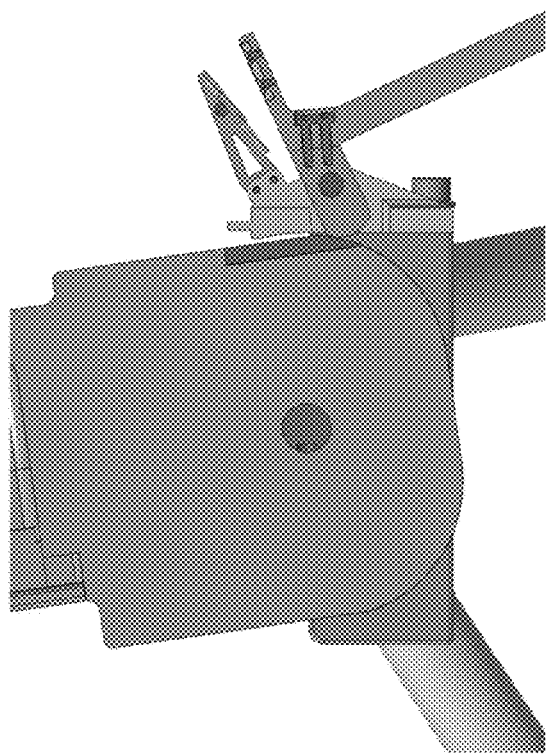
Figure 12H:
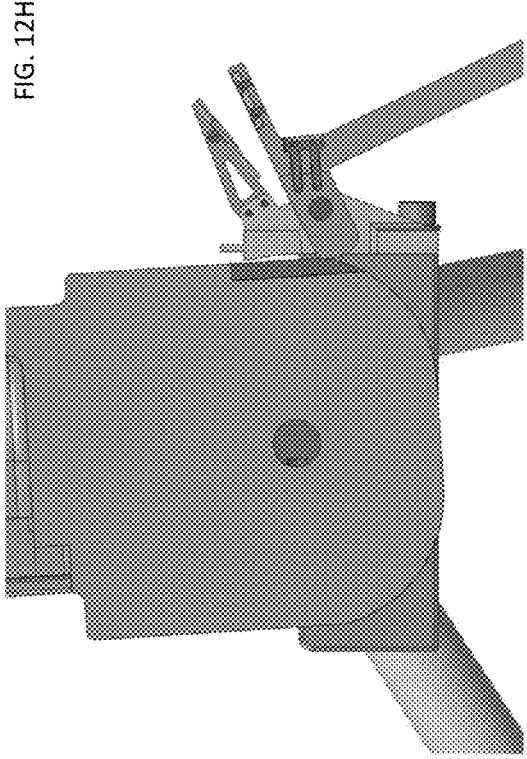
Figure 12J:
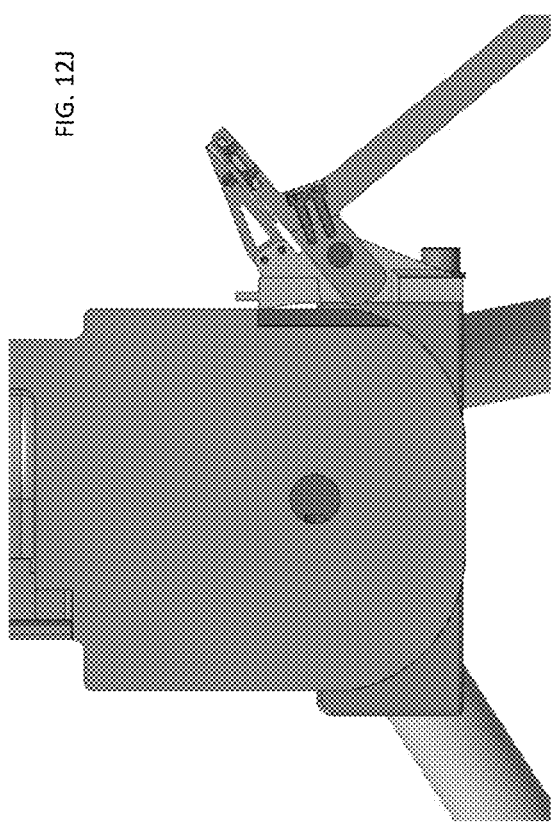
Figure 12I:
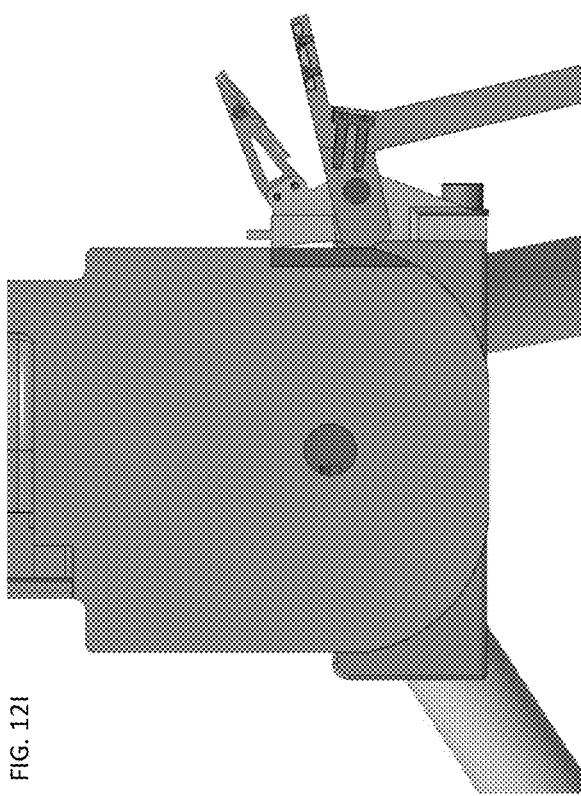

In FIG. 12C, the mast is stowed and the mast is ready for deployment. As shown at point 1200 the pawl assembly is in the locked position. Here, the pawl member rests against the hard stop of the mast in this state, which is past the position when the mast is deployed and the pawl assembly is locked. As shown in FIG. 12D, deployment begins by rotating the mast in a clockwise direction so that the upper section of the mast moves upward. FIG. 12E illustrates where the mast first makes contact with the pawl member at point 1202. As shown in FIG. 12F, the pawl assembly begins to move up as the mast rotates. And in FIGS. 12G and 12H, it can be seen that the movement of the pawl assembly continues this movement, which is due to the spring (not shown). In FIG. 12I, the mast is now fully deployed. Here, the pawl member impinges the mast surface and is locked. FIG. 12J illustrates positioning where the pawl assembly is unlocked so that the mast is able to be stowed.

In contrast to automatic locking as shown above, if the pawl assembly is in the unlocked position for deployment, an operator or an additional mechanism would be needed to lower the pawl assembly to the locked position afterwards.

In the locked position, the geometry interference between an end of the pawl member and the surface of the mast structure prevents motion and maintains contact due to the generated frictional force. To release the joint, the pawl member is rotated in the opposite direction to remove the geometry interference condition. With reference to FIG. 11A, this may be done by applying a force to the pawl handle and rotating it in a counterclockwise direction. The pawl handle may be rotated manually, thereby eliminating unnecessary additional components.

The locking pawl arrangement discussed above eliminates backlash and requires minimal involvement from a person such as the driver of the vehicle. In particular, a geometry interference is present during one direction of motion. With reference to FIG. 10B, the geometry interference prevents the mast from rotating in a counterclockwise direction so long as the pawl member is engaged.

Figure 13:
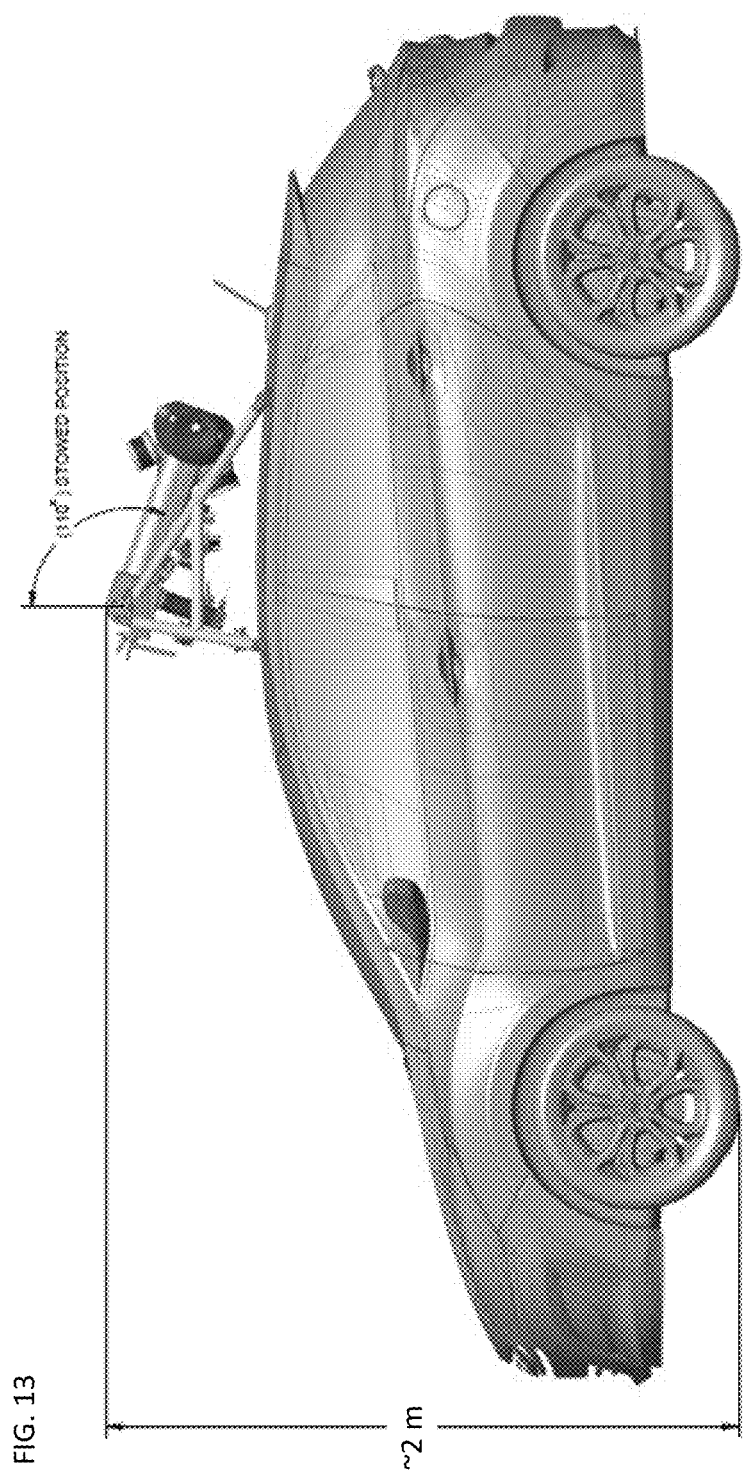
FIG. 13 illustrates a camera mast in a stowed configuration.

Beneficially, the locking pawl can be disengaged so that the camera mast may be lowered. An example of this is illustrated in FIG. 13. When the mast is in a stowed (unlocked) state, it is folded down. As shown in the example of FIG. 13, the mast is arranged at an angle of about 110° relative to the deployed state. The angle may vary depending on the type of vehicle, length and configuration of the mast, the devices attached to the mast, etc. For instance, in one scenario the angle in the stowed position may be between 90-120°. In another scenario, the angle may be no more than 100°. And in yet another scenario, the angle may be up to 140°. One benefit of stowing the mast is that it lowers the overall height of the vehicle plus mounted assembly. For instance, as shown in FIG. 13 the overall folded height may be approximately 2 meters. In the deployed state, the overall height of the vehicle plus mounted assembly may be around 3 meters or more. The additional height can present a problem when entering a garage, tunnel or other structure.

To retain the pawl in the unlocked state and allow mast stowing, a surface of the pawl assembly is desirably coupled to a portion of the mounting assembly. The pawl assembly can be in the locked position while the mast is in the fully stowed state. In one scenario, the pawl assembly need only be in the unlock position for approximately the first third of downward travel. The engagement member of the pawl assembly can couple to or otherwise engage the sensor bracket. This is done by the magnet sticking to the sensor bracket. The magnet serves two functions. One function is to hold the engagement member of the pawl assembly up to the sensor bracket so that the pawl assembly stays in the unlocked position. This beneficially frees the hands of the user to actuate the mast and lower it to the stowed position. The other function of the magnet is to trigger the Hall effect sensor, which indicates to the system that the pawl assembly is in the unlocked position.

Figure 14D:
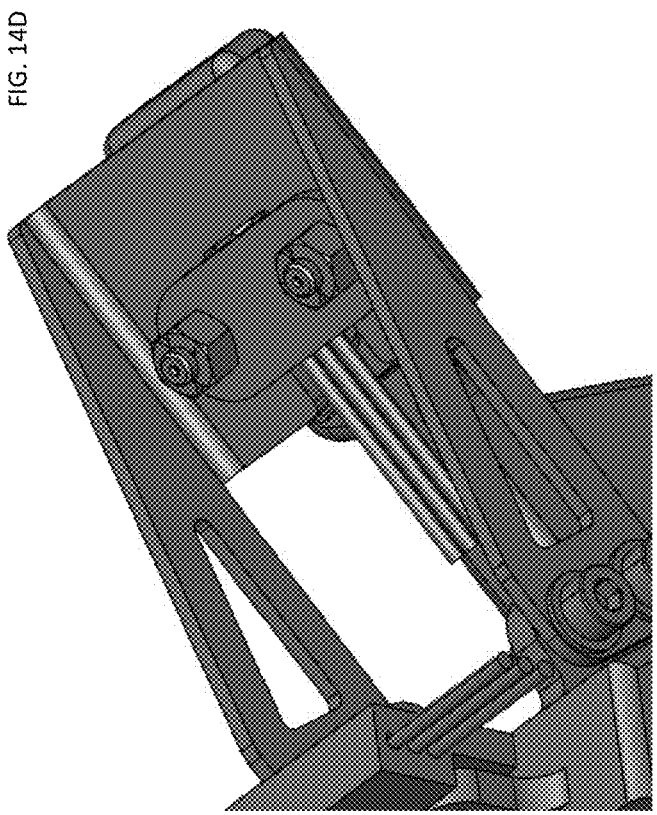
Figure 14C:
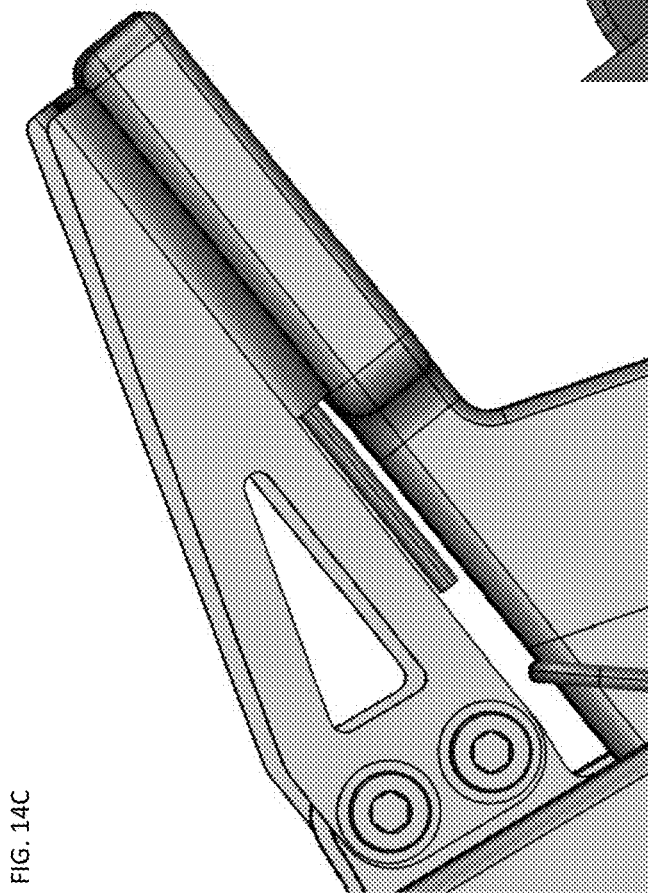

FIGS. 14A-B illustrate the engagement member and the sensor bracket when the pawl assembly is in the locked position and the mast is prevented from rotating. As shown, the engagement member includes a magnet 1402, and the sensor bracket includes a sensor (see also 414 in FIG. 4A). The magnet 1402 may be secured to the engagement member using an adhesive. Alternatively, one or more fasteners or other securing mechanisms may be employed. Also, while only one magnet is shown, multiple magnets may be used.

The sensor is configured to detect the state of the pawl assembly. In particular, when the sensor detects that the engagement member is in adjacent proximity to the sensor bracket, there is a determination that the pawl assembly is in the unlocked position. The sensor may be a Hall Effect sensor that determines the proximity to the magnet. Since there may be pole sensitivity, the magnet includes one or more countersunk holes 1406 (see FIGS. 14A-B) to determine orientation. The Hall Effect sensor is arranged in a slot (see FIG. 9A) of the sensor bracket. This placement is beneficial due to the sensor's sensitivity to ferrous material. Alternatives to a Hall Effect sensor may also be employed. For instance, mechanical, electrical or optical contact arrangements may be used to detect whether the pawl assembly is in the unlocked position.

Example Methods

One example scenario of operation can be seen in relation to FIGS. 1A-B and is described in relation to FIGS. 15A-B. Initially, the vehicle may set out with the mast in the stowed state. This may allow the vehicle to exit a parking structure with low overhead. When the vehicle departs, the driver or user of the system can determine that the pawl assembly is in the locked position via the sensor. For instance, the sensor may send a signal to a processor or control logic associated with the mast assembly or with the vehicle, which indicates the position status. Thus, the mast may not be raised unless the pawl assembly is in the locked position. This makes the process a passive lock upon deployment as discussed above. In process 1500 of FIG. 15A, this occurs at block 1502. Once the vehicle leaves the parking structure and prior to capturing images with the cameras and/or other sensors arranged on the mast, the mast is raised to a deployed position, as shown in block 1504. This may be done, as described above, using a motor and gears. Alternatively, it may be raised with some other mechanism or manually. And as noted above, in the fully deployed position, the pawl member automatically locks the mast in place such that there is zero backlash. This is shown in block 1506. Next, process 1510 of FIG. 15B describes disengagement. For instance, when imaging is completed or the mast is no longer needed in the fully deployed position, the pawl handle is actuated in a direction that disengages the pawl member from the mast. This occurs at block 1512. At this point, as shown in block 1514, the system may determine from the sensor that the pawl assembly is in the unlocked position and able to be lowered. Then the mast is lowered to the stowed position, as shown at block 1516.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A system for mounting to a vehicle, the system comprising:
    a mast structure having a mast and a support frame secured to the mast, the support frame arranged for affixation to a vehicle; and
    a locking mechanism, comprising:
        a mast stop member configured for affixation to the mast structure, the mast stop member including at least one receptacle arranged along a first axis, the mast stop member having a first surface that prevents the mast from rotating in a first direction;
        a pawl member having a first end, a second end remote from the first end, and a receptacle disposed between the first end and the second end, the first end being configured to releasable engage a surface of the mast, the receptacle being aligned with the at least one receptacle of the mast stop member along the first axis, and the second end being configured to selectively disengage the first end of the pawl member from the surface of the mast so that the mast is rotatable about a second axis different from the first axis, wherein rotation about the second axis is only permitted in a second direction opposite the first direction;
        a shaft member received by the at least one receptacle of the mast stop member and the receptacle of the pawl member along the first axis; and
        a torsion spring received along the shaft member and coupling to the pawl member, the torsion spring securing the first end of the pawl member against the surface of the mast in a deployed state with zero backlash.

2. The system of claim 1, the locking mechanism further comprising a sensor member, the sensor member having a sensor bracket and a sensor affixed to the sensor bracket, the sensor being configured to detect whether an engagement member of the pawl member is in adjacent proximity to the sensor bracket to indicate that the pawl member is in an unlocked position relative to the surface of the mast.

3. The system of claim 1, wherein the second end of the pawl member comprises an elongated handle.

4. The system of claim 1, wherein in the deployed state the mast has a first alignment substantially perpendicular to a roof surface of the vehicle or to a ground surface, and the first alignment is maintained with the first end of the pawl member secured against the surface of the mast.

5. The system of claim 4, wherein in a disengaged state the first end of the pawl member does not contact the surface of the mast.

6. The system of claim 5, wherein in the disengaged state the mast is rotatable from the first alignment to a second alignment, the second alignment being between about 90-120° relative to the first alignment.

7. A method of operating a zero backlash locking assembly, the method comprising:
    detecting that a pawl assembly of the locking assembly is in a locked position relative to an elongated mast;
    upon detecting the locked position, raising the elongated mast from a stowed position to a deployed position; and
    automatically locking the mast in the deployed position by impinging a first end of the pawl assembly against a surface of the elongated mast, wherein a torsion spring secures the first end of the pawl assembly against the surface of the mast with zero backlash.

8. The method of claim 7, further comprising actuating a handle of the pawl assembly in a direction to disengage the first end of the pawl assembly from the surface of the elongated mast, wherein upon disengagement the pawl assembly is temporarily retained in an unlocked state.

9. The method of claim 8, further comprising, upon disengagement and the pawl assembly being retained in the unlocked stated, rotating the elongated mast from the deployed position to the stowed position.

\* \* \* \* \*